US012227720B2

(12) United States Patent
Smets et al.

(10) Patent No.: US 12,227,720 B2
(45) Date of Patent: Feb. 18, 2025

(54) CONSUMER PRODUCT COMPOSITIONS WITH AT LEAST TWO ENCAPSULATE POPULATIONS

(71) Applicant: The Procter & Gamble Company, Cincinnati, OH (US)

(72) Inventors: Johan Smets, Lubbeek (BE); An Pintens, Brasschaat (BE); Conny Erna Alice Joos, Buggenhout (BE); Joana Andreia Lameiras Domingues, Brussels (BE); Fadi Selim Chakar, Neenah, WI (US); Linsheng Feng, Menasha, WI (US); Presley Genevie Neuman, Appleton, WI (US); Robert Stanley Bobnock, Menasha, WI (US)

(73) Assignee: The Procter & Gamble Company, Cincinnati, OH (US)

( * ) Notice: Subject to any disclaimer, the term of this patent is extended or adjusted under 35 U.S.C. 154(b) by 260 days.

(21) Appl. No.: 17/500,975

(22) Filed: Oct. 14, 2021

(65) Prior Publication Data

US 2022/0119742 A1 Apr. 21, 2022

Related U.S. Application Data

(60) Provisional application No. 63/092,526, filed on Oct. 16, 2020.

(51) Int. Cl.
*C11D 17/00* (2006.01)
*C11D 3/37* (2006.01)
*C11D 3/50* (2006.01)
*C11D 17/06* (2006.01)

(52) U.S. Cl.
CPC ........ *C11D 17/0039* (2013.01); *C11D 3/3761* (2013.01)

(58) Field of Classification Search
None
See application file for complete search history.

(56) References Cited

U.S. PATENT DOCUMENTS

| | | | |
|---|---|---|---|
| 2,396,278 | A | 3/1946 | Otto |
| 2,438,091 | A | 3/1948 | Lynch |
| 2,486,921 | A | 11/1949 | Byerly |
| 2,486,922 | A | 11/1949 | Bruce |
| 2,528,378 | A | 10/1950 | McCabe, Jr. |
| 2,658,072 | A | 11/1953 | Kosmin |
| 2,730,456 | A | 1/1956 | Green |
| 2,730,457 | A | 1/1956 | Green |
| 2,800,457 | A | 7/1957 | Green |
| 2,800,458 | A | 7/1957 | Green |
| 2,809,971 | A | 10/1957 | Jack |
| 2,826,551 | A | 3/1958 | Geen |
| RE24,899 | E | 11/1960 | Green |
| 3,049,509 | A | 8/1962 | Hardy et al. |
| 3,236,733 | A | 2/1966 | Karsten |
| 3,332,880 | A | 7/1967 | Adriaan |
| 3,429,827 | A | 2/1969 | Ruus |
| 3,516,941 | A | 6/1970 | Matson |
| 3,660,304 | A | 5/1972 | Matsukawa |
| 3,681,248 | A | 8/1972 | Gould |
| 3,691,140 | A | 9/1972 | Silver |
| 3,753,196 | A | 8/1973 | Kurtz |
| 3,761,418 | A | 9/1973 | Parran |
| 3,772,215 | A | 11/1973 | Gould |
| 3,826,756 | A | 7/1974 | Bachmann |
| 3,886,085 | A | 5/1975 | Kiritani |
| 3,898,039 | A | 8/1975 | Lin |
| 3,920,819 | A | 11/1975 | Stephens |
| 3,929,678 | A | 12/1975 | Laughlin et al. |
| 3,958,581 | A | 5/1976 | Abegg |
| 3,962,418 | A | 6/1976 | Birkofer |
| 3,964,500 | A | 6/1976 | Drakoff |
| 3,965,033 | A | 6/1976 | Matsukawa |
| 4,001,140 | A | 1/1977 | Foris |
| 4,046,750 | A | 9/1977 | Rembaum |
| 4,062,799 | A | 12/1977 | Matsukawa |
| 4,075,134 | A | 2/1978 | Morehouse, Jr. |
| 4,081,376 | A | 3/1978 | Strub |
| 4,087,376 | A | 5/1978 | Foris |
| 4,089,802 | A | 5/1978 | Foris |
| 4,093,556 | A | 6/1978 | Wojciak |
| 4,100,103 | A | 7/1978 | Foris |
| 4,105,823 | A | 8/1978 | Hasler |
| 4,145,184 | A | 3/1979 | Brain |
| 4,166,152 | A | 8/1979 | Baker |

(Continued)

FOREIGN PATENT DOCUMENTS

| | | | |
|---|---|---|---|
| AU | 2616292 | A | 4/1993 |
| CN | 101088567 | A | 12/2007 |

(Continued)

OTHER PUBLICATIONS

15905 PCT Search Report and Written Opinion for PCT/US2021/071855 dated Mar. 11, 2022, 13 pages.
"Aluminum Silicate Powder from READE", retrieved on Jul. 23, 2014, pp. 1-2.
All Office Actions; U.S. Appl. No. 17/500,974, filed Oct. 14, 2021.
All Office Actions; U.S. Appl. No. 17/500,978, filed Oct. 14, 2021.
Brunauer, et al., "Absorption of Gases in Multimolecular Layers", Journal of the American Chemical Society, vol. 60, 1938, pp. 309-319.
Cayer, "Polymer-based Functional Particulates: Design, Syntheses and Applications", Nov. 11, 2014, XP 055249238, 44pgs.
Celvol Polyvinyl Alcohol . . . A Versatile High-Performance Polymer, Internet Citation, Jan. 1, 2007, pp. 1-16, XP002632184, Retrieved from the Internet: URL: http://www.celanese.com/celvol_polyvinyl_alcohol.pdf [retrieved on Apr. 8, 2011] the whole document.

(Continued)

*Primary Examiner* — Lorna M Douyon
(74) *Attorney, Agent, or Firm* — John G. Powell; George H. Leal

(57) ABSTRACT

Consumer product compositions, such as fabric care compositions, that include first and second populations of encapsulates, where at least one of the populations is characterized by a relatively high core:shell weight ratio. Methods related to the use and making of such compositions.

23 Claims, 1 Drawing Sheet

(56) References Cited

U.S. PATENT DOCUMENTS

| | | | |
|---|---|---|---|
| 4,183,911 | A | 1/1980 | Smithies |
| 4,197,346 | A | 4/1980 | Stevens |
| 4,197,865 | A | 4/1980 | Jacquet |
| 4,217,914 | A | 8/1980 | Jacquet |
| 4,221,710 | A | 9/1980 | Hoshi |
| 4,234,627 | A | 11/1980 | Schilling |
| 4,240,450 | A | 12/1980 | Cauwet |
| 4,247,411 | A | 1/1981 | Vanlerberghe |
| 4,251,386 | A | 2/1981 | Saeki |
| 4,254,201 | A | 3/1981 | Sawai et al. |
| 4,275,055 | A | 6/1981 | Nachtigal |
| 4,285,720 | A | 8/1981 | Scher |
| 4,323,683 | A | 4/1982 | Bolich, Jr. |
| 4,345,080 | A | 8/1982 | Bolich, Jr. |
| 4,356,109 | A | 10/1982 | Saeki |
| 4,364,837 | A | 12/1982 | Pader |
| 4,379,753 | A | 4/1983 | Bolich, Jr. |
| 4,381,919 | A | 5/1983 | Jacquet |
| 4,422,853 | A | 12/1983 | Jacquet |
| 4,423,099 | A | 12/1983 | Mueller |
| 4,428,869 | A | 1/1984 | Munteanu |
| 4,430,243 | A | 2/1984 | Bragg |
| 4,444,699 | A | 4/1984 | Hayford |
| 4,446,032 | A | 5/1984 | Munteanu |
| 4,450,123 | A | 5/1984 | Egawa |
| 4,470,982 | A | 9/1984 | Winkler |
| 4,507,280 | A | 3/1985 | Pohl |
| 4,515,705 | A | 5/1985 | Moeddel |
| 4,529,586 | A | 7/1985 | De Marco |
| 4,537,706 | A | 8/1985 | Severson, Jr. |
| 4,537,707 | A | 8/1985 | Severson, Jr. |
| 4,547,429 | A | 10/1985 | Greiner |
| 4,550,862 | A | 11/1985 | Barker |
| 4,552,811 | A | 11/1985 | Brown |
| 4,561,997 | A | 12/1985 | Roehl |
| 4,561,998 | A | 12/1985 | Wertz |
| 4,574,110 | A | 3/1986 | Asano |
| 4,588,639 | A | 5/1986 | Ozono |
| 4,597,898 | A | 7/1986 | Vander |
| 4,601,863 | A | 7/1986 | Shioi |
| 4,608,250 | A | 8/1986 | Jacquet |
| 4,610,927 | A | 9/1986 | Igarashi |
| 4,622,267 | A | 11/1986 | Riecke |
| 4,626,372 | A | 12/1986 | Kaufmann et al. |
| 4,663,158 | A | 5/1987 | Wolfram |
| 4,687,808 | A | 8/1987 | Jarrett et al. |
| 4,708,924 | A | 11/1987 | Nagai |
| 4,719,099 | A | 1/1988 | Grollier |
| 4,722,865 | A | 2/1988 | Huizer |
| 4,741,855 | A | 5/1988 | Grote |
| 4,746,467 | A | 5/1988 | Sakamoto |
| 4,754,110 | A | 6/1988 | Craft |
| 4,775,656 | A | 10/1988 | Harada |
| 4,780,370 | A | 10/1988 | Pointier |
| 4,798,691 | A | 1/1989 | Kasai |
| 4,803,947 | A | 2/1989 | Ueki |
| 4,824,707 | A | 4/1989 | Spector |
| 4,863,626 | A | 9/1989 | Coyne |
| 4,865,759 | A | 9/1989 | Coyne |
| 4,882,220 | A | 11/1989 | Ono |
| 4,908,271 | A | 3/1990 | Kasai |
| 4,911,851 | A | 3/1990 | Ladd, Jr. |
| 4,917,920 | A | 4/1990 | Ono |
| 4,919,841 | A | 4/1990 | Kamel |
| 4,946,624 | A | 8/1990 | Michael |
| 4,957,666 | A | 9/1990 | Kawamura |
| 4,968,451 | A | 11/1990 | Scheibel |
| 4,972,000 | A | 11/1990 | Kawashima |
| 5,009,880 | A | 4/1991 | Grollier |
| 5,061,410 | A | 10/1991 | Sakamoto |
| 5,066,419 | A | 11/1991 | Walley |
| 5,071,706 | A | 12/1991 | Soper |
| 5,104,646 | A | 4/1992 | Bolich, Jr. |
| 5,105,823 | A | 4/1992 | Blum |
| 5,106,609 | A | 4/1992 | Bolich, Jr. |
| 5,113,585 | A | 5/1992 | Rogers |
| 5,118,756 | A | 6/1992 | Asano |
| 5,120,349 | A | 6/1992 | Stewart |
| 5,137,646 | A | 8/1992 | Schmidt et al. |
| 5,145,675 | A | 9/1992 | Won |
| 5,176,903 | A | 1/1993 | Goldberg |
| 5,185,155 | A | 2/1993 | Behan |
| 5,188,753 | A | 2/1993 | Schmidt |
| 5,225,278 | A | 7/1993 | Kielbania, Jr. |
| 5,230,822 | A | 7/1993 | Kamel et al. |
| 5,232,613 | A | 8/1993 | Bacon |
| 5,232,769 | A | 8/1993 | Yamato |
| 5,234,611 | A | 8/1993 | Trinh |
| 5,234,682 | A | 8/1993 | Macchio |
| 5,277,979 | A | 1/1994 | Kielbania, Jr. |
| 5,278,106 | A | 1/1994 | Nakashima |
| 5,281,355 | A | 1/1994 | Tsaur et al. |
| 5,292,835 | A | 3/1994 | Jahns |
| RE34,584 | E | 4/1994 | Grote |
| 5,324,444 | A | 6/1994 | Berry |
| 5,324,445 | A | 6/1994 | Langley et al. |
| 5,342,556 | A | 8/1994 | Traeubel |
| 5,362,565 | A | 11/1994 | Murano |
| 5,366,652 | A | 11/1994 | Capeci |
| 5,370,881 | A | 12/1994 | Fuisz |
| 5,380,756 | A | 1/1995 | Andrews |
| 5,399,192 | A | 3/1995 | Yamasoe |
| 5,407,609 | A | 4/1995 | Tice |
| 5,468,473 | A | 11/1995 | Mullen |
| 5,486,303 | A | 1/1996 | Capeci |
| 5,487,884 | A | 1/1996 | Bissett |
| 5,489,392 | A | 2/1996 | Capeci |
| 5,516,448 | A | 5/1996 | Capeci |
| 5,565,145 | A | 10/1996 | Watson |
| 5,565,422 | A | 10/1996 | Del Greco |
| 5,569,645 | A | 10/1996 | Dinniwell |
| 5,573,756 | A | 11/1996 | Lambrechts |
| 5,574,005 | A | 11/1996 | Welch |
| 5,575,282 | A | 11/1996 | Knoch |
| 5,576,282 | A | 11/1996 | Miracle |
| 5,580,578 | A | 12/1996 | Oshlack |
| 5,595,967 | A | 1/1997 | Miracle |
| 5,596,051 | A | 1/1997 | Jahns |
| 5,597,936 | A | 1/1997 | Perkins |
| 5,607,980 | A | 3/1997 | Mcatee |
| 5,611,972 | A | 3/1997 | Tararuj |
| 5,637,401 | A | 6/1997 | Berman |
| 5,648,328 | A | 7/1997 | Angell |
| 5,652,228 | A | 7/1997 | Bissett |
| 5,656,584 | A | 8/1997 | Angell |
| 5,674,478 | A | 10/1997 | Dodd |
| 5,681,852 | A | 10/1997 | Bissett |
| 5,691,297 | A | 11/1997 | Nassano |
| 5,702,714 | A | 12/1997 | Goss |
| 5,716,938 | A | 2/1998 | Provitt |
| 5,723,420 | A | 3/1998 | Wei |
| 5,725,869 | A | 3/1998 | Lo |
| 5,750,122 | A | 5/1998 | Evans |
| 5,756,436 | A | 5/1998 | Royce |
| 5,759,573 | A | 6/1998 | Kim |
| 5,782,409 | A | 7/1998 | Paul |
| 5,783,536 | A | 7/1998 | Farrell |
| 5,800,805 | A | 9/1998 | Salas |
| 5,807,956 | A | 9/1998 | Czech |
| 5,827,538 | A | 10/1998 | Cussler |
| 5,833,971 | A | 11/1998 | Baldwin |
| 5,856,409 | A | 1/1999 | Ziemelis |
| 5,876,755 | A | 3/1999 | Perring |
| 5,879,584 | A | 3/1999 | Bianchetti |
| 5,885,701 | A | 3/1999 | Berman |
| 5,929,022 | A | 7/1999 | Velazquez |
| 5,945,085 | A | 8/1999 | Salas |
| 5,962,018 | A | 10/1999 | Curtis |
| 5,972,859 | A | 10/1999 | Farrell |
| 5,981,681 | A | 11/1999 | Czech |
| 6,024,943 | A | 2/2000 | Ness |
| D424,745 | S | 5/2000 | Tseng |
| 6,075,003 | A | 6/2000 | Haq |
| 6,147,037 | A | 11/2000 | Gardlik |

(56) References Cited

U.S. PATENT DOCUMENTS 6,159,485 A 12/2000 Yu
6,182,365 B1 2/2001 Tseng
6,185,822 B1 2/2001 Tseng
6,194,375 B1 2/2001 Ness
6,207,782 B1 3/2001 Czech
6,221,326 B1 4/2001 Amiche
6,221,826 B1 4/2001 Surutzidis
6,225,464 B1 5/2001 Hiler, II
6,228,398 B1 5/2001 Devane
6,235,274 B1 5/2001 Lou
6,235,773 B1 5/2001 Bissett
6,245,366 B1 6/2001 Popplewell
6,245,733 B1 6/2001 Mosbaugh
6,248,364 B1 6/2001 Sengupta
6,258,857 B1 7/2001 Iijima
6,261,483 B1 7/2001 Frank
6,294,514 B1 9/2001 Welling
6,298,558 B1 10/2001 Tseng
6,306,812 B1 10/2001 Perkins
6,325,995 B1 12/2001 El-Nokaly
6,326,348 B1 12/2001 Vinson
6,329,057 B1 12/2001 Dungworth
6,348,218 B1 2/2002 Hed
6,355,263 B1 3/2002 Shuku et al.
6,362,159 B1 3/2002 Aguadisch
6,368,633 B1 4/2002 Lou
6,375,872 B1 4/2002 Chao
6,375,983 B1 4/2002 Kantor
6,376,445 B1 4/2002 Bettiol
6,399,192 B1 6/2002 Pinna
6,413,548 B1 7/2002 Hamer
6,428,796 B1 8/2002 Gers-Barlag
6,451,754 B1 9/2002 Rowland
6,482,969 B1 11/2002 Helmrick
6,489,047 B2 12/2002 Mosbaugh
6,498,135 B1 12/2002 Angell
6,503,495 B1 1/2003 Alwattari
6,524,564 B1 2/2003 Kim
6,531,156 B1 3/2003 Clark
6,550,092 B1 4/2003 Brown
6,558,706 B2 5/2003 Kantor
6,592,990 B2 7/2003 Schwantes
6,594,904 B1 7/2003 Tseng
6,607,717 B1 8/2003 Johnson
6,608,017 B1 8/2003 Dihora
6,638,591 B2 10/2003 Bowen
6,670,311 B1 12/2003 Aldcroft
6,682,749 B1 1/2004 Potechin
6,696,049 B2 2/2004 Vatter
6,696,400 B2 2/2004 Puelle
6,703,032 B2 3/2004 Gers-barlag
6,730,325 B2 5/2004 Devane
6,733,790 B1 5/2004 Garces
6,767,880 B1 7/2004 Foley
6,769,271 B2 8/2004 Mosbaugh
6,770,293 B2 8/2004 Angel
6,780,507 B2 8/2004 Toreki
6,783,770 B2 8/2004 Angel
6,790,814 B1 9/2004 Marin
6,793,936 B2 9/2004 Devane
6,797,683 B2 9/2004 Shana
6,800,598 B1 10/2004 Waeschenbach
6,806,249 B2 10/2004 Yang
6,838,087 B1 1/2005 Day
6,846,785 B2 1/2005 Patel
6,849,584 B2 2/2005 Geary
6,849,591 B1 2/2005 Boeckh
6,864,223 B2 3/2005 Smith
6,869,923 B1 3/2005 Cunningham
6,872,696 B2 3/2005 Becker et al.
6,872,853 B1 3/2005 Van Der Schaaf
6,881,482 B2 4/2005 Vasisht
6,902,742 B2 6/2005 Devane
6,916,481 B1 7/2005 Prud Homme
6,939,992 B2 9/2005 Van Der Schaaf
6,944,952 B1 9/2005 Tseng
6,949,498 B2 9/2005 Murphy et al.
6,951,836 B2 10/2005 Jahns
6,955,823 B2 10/2005 Casson
6,958,313 B2 10/2005 Caswell
6,982,256 B2 1/2006 Votteler
7,015,186 B2 3/2006 Aussant
7,041,767 B2 5/2006 Lange
7,053,034 B2 5/2006 Shefer
7,069,658 B2 7/2006 Tseng
7,105,064 B2 9/2006 Popplewell
7,119,057 B2 10/2006 Popplewell
7,122,512 B2 10/2006 Brain
7,125,835 B2 10/2006 Bennett
7,137,570 B2 11/2006 Wheatley
7,159,792 B2 1/2007 Wheatley
7,169,741 B2 1/2007 Barry et al.
7,186,679 B2 3/2007 Shepherd, Jr.
7,186,680 B2 3/2007 Caswell
7,192,599 B2 3/2007 Mercier
7,196,049 B2 3/2007 Brain
7,204,998 B2 4/2007 Holzner
7,208,463 B2 4/2007 Heltovics
7,208,465 B2 4/2007 Heltovics
7,211,273 B2 5/2007 Hsu
7,211,556 B2 5/2007 Heibel
7,217,777 B2 5/2007 Lange
7,226,607 B2 6/2007 Uchiyama
7,229,611 B2 6/2007 Zamudio-Tena
7,235,261 B2 6/2007 Smith
7,241,835 B2 7/2007 Obrien
7,247,374 B2 7/2007 Haggquist
7,270,828 B2 9/2007 Masuda
7,279,542 B2 10/2007 Ouali
7,293,719 B2 11/2007 Wheatley
7,294,612 B2 11/2007 Popplewell
7,311,900 B2 12/2007 Conover
7,338,928 B2 3/2008 Lau
7,375,875 B2 5/2008 Whitesides
7,381,417 B2 6/2008 Gamez-garcia
7,399,324 B2 7/2008 Roddenbery
7,407,650 B2 8/2008 Heltovics
7,413,731 B2 8/2008 Heltovics
7,442,838 B2 10/2008 Van Der Schaaf
7,452,547 B2 11/2008 Lambino
7,465,439 B2 12/2008 Avery
7,491,687 B2 2/2009 Popplewell
7,521,124 B2 4/2009 Ahn
7,524,807 B2 4/2009 Clapp
7,532,388 B2 5/2009 Whitesides
7,538,077 B2 5/2009 Sichmann
7,538,078 B2 5/2009 Holzner
7,569,528 B2 8/2009 Lant
7,575,633 B2 8/2009 Romanin
7,575,804 B2 8/2009 Lang-Wittkowski
7,585,824 B2 9/2009 Popplewell
7,585,825 B2 9/2009 Artiga
7,585,832 B2 9/2009 Smith
7,736,695 B2 6/2010 Schwantes
7,772,175 B2 8/2010 Panandiker
7,794,836 B2 9/2010 Vasishtha
7,799,421 B2 9/2010 Goodson
7,799,752 B2 9/2010 Ness
7,803,422 B2 9/2010 Schwantes
7,833,960 B2 11/2010 Lei
7,871,588 B2 1/2011 Lindner
7,932,191 B2 4/2011 Dungworth et al.
7,968,510 B2 6/2011 Smets et al.
7,985,445 B2 7/2011 Schwantes
7,998,494 B2 8/2011 Holzner
8,022,029 B2 9/2011 Broze
8,026,205 B2 9/2011 Broze
8,053,405 B2 11/2011 Narayanan
8,067,089 B2 11/2011 Schwantes
8,071,214 B2 12/2011 Schwantes
8,093,201 B2 1/2012 Broze
8,110,284 B2 2/2012 Naigertsik
8,119,163 B2 2/2012 Devane
8,129,327 B2 3/2012 Zhang

(56) References Cited

U.S. PATENT DOCUMENTS 8,147,808 B2 4/2012 Scavone
8,158,571 B2 4/2012 Alonso
8,163,207 B2 4/2012 Jung
8,192,838 B2 6/2012 Goodson
8,206,820 B2 6/2012 Bogaerts
8,242,069 B2 8/2012 Struillou
8,246,869 B2 8/2012 Stowell
8,252,356 B2 8/2012 Ogura
8,304,075 B2 11/2012 Lang-wittkowski
8,329,154 B2 12/2012 Uchiyama
8,349,300 B2 1/2013 Wells
8,354,369 B2 1/2013 Beaussoubre
8,426,194 B2 4/2013 Cao
8,455,098 B2 6/2013 Schwantes
8,460,791 B2 6/2013 Hentze
8,460,864 B2 6/2013 Cao
8,470,762 B2 6/2013 Broze
8,551,935 B2 10/2013 Smets
8,784,984 B2 7/2014 Grey
8,853,142 B2 10/2014 Corominas et al.
RE45,538 E 6/2015 Smets
9,162,085 B2 10/2015 Dihora et al.
9,186,642 B2 11/2015 Dihora
9,221,028 B2 12/2015 Dihora
9,415,530 B2 8/2016 Fukuda
9,579,676 B1 2/2017 Burrowes
9,885,009 B2 2/2018 Brundel et al.
9,890,351 B2 2/2018 Smets
9,895,297 B2 2/2018 Ribaut
9,993,793 B2 6/2018 Dihora
10,059,907 B2 8/2018 Ribaut
10,308,894 B2 6/2019 Feng
10,385,297 B2 8/2019 Song et al.
10,920,177 B2 2/2021 Smets et al.
2002/0010123 A1 1/2002 Schmiedel et al.
2002/0016269 A1 2/2002 Noda
2002/0102286 A1 8/2002 Kantor
2002/0136773 A1 9/2002 Scher
2002/0169233 A1 11/2002 Schwantes
2003/0017126 A1 1/2003 Mahadeshwar
2003/0017959 A1 1/2003 Baeck
2003/0024997 A1 2/2003 Welch
2003/0031722 A1 2/2003 Cao
2003/0073607 A1 4/2003 Smets
2003/0077378 A1 4/2003 Lou
2003/0108501 A1 6/2003 Hofrichter
2003/0109391 A1 6/2003 Midha
2003/0125222 A1 7/2003 Jahns
2003/0139312 A1 7/2003 Caswell
2003/0152542 A1 8/2003 Decoster
2003/0170304 A1 9/2003 Devane
2003/0194416 A1 10/2003 Shefer
2003/0199412 A1 10/2003 Gupta
2003/0203978 A1 10/2003 Obrien
2003/0215417 A1 11/2003 Uchiyama
2003/0216488 A1 11/2003 Uchiyama
2003/0220220 A1 11/2003 Bach
2004/0013737 A1 1/2004 Becourt
2004/0043078 A1 3/2004 Herault
2004/0071742 A1 4/2004 Popplewell
2004/0087470 A1 5/2004 Grandmaire
2004/0091445 A1 5/2004 Dykstra
2004/0092425 A1 5/2004 Boutique et al.
2004/0101577 A1 5/2004 Ahn
2004/0109920 A1 6/2004 Reuscher
2004/0110898 A1 6/2004 Dreja
2004/0137028 A1 7/2004 Poterie
2004/0138088 A1 7/2004 Pereira
2004/0175347 A1 9/2004 Bissett
2004/0175404 A1 9/2004 Shefer
2004/0197405 A1 10/2004 Devane
2004/0208902 A1 10/2004 Gupta
2004/0214742 A1 10/2004 Meli
2004/0220062 A1 11/2004 Pereira
2004/0229769 A1 11/2004 Smith
2004/0251569 A1 12/2004 Matsubara
2004/0267182 A1 12/2004 Davis et al.
2005/0014674 A1 1/2005 Liechty
2005/0026801 A1 2/2005 Broeckx et al.
2005/0038188 A1 2/2005 Ahn
2005/0043209 A1 2/2005 Schmiedel
2005/0048549 A1 3/2005 Cao
2005/0089540 A1 4/2005 Uchiyama
2005/0112152 A1 5/2005 Popplewell
2005/0113282 A1 5/2005 Parekh
2005/0119351 A1 6/2005 Van Der Schaaf
2005/0129759 A1 6/2005 Sojka
2005/0169793 A1 8/2005 Wheatley
2005/0215457 A1 9/2005 Becks et al.
2005/0226900 A1 10/2005 Winton
2005/0227907 A1 10/2005 Lee
2005/0276831 A1 12/2005 Dihora
2006/0008646 A1 1/2006 Haggquist
2006/0099168 A1 5/2006 Corzani
2006/0116304 A1 6/2006 Mcritchie
2006/0127430 A1 6/2006 Gupta
2006/0134154 A1 6/2006 Giles
2006/0160711 A1 7/2006 Frank
2006/0165740 A1 7/2006 Frank
2006/0166855 A1 7/2006 Murad
2006/0217288 A1 9/2006 Wahl
2006/0240105 A1 10/2006 Devane
2006/0248665 A1 11/2006 Pluyter
2006/0258557 A1 11/2006 Popplewell
2006/0263311 A1 11/2006 Scavone
2006/0263312 A1 11/2006 Scavone
2006/0263313 A1 11/2006 Scavone
2006/0263518 A1 11/2006 Schwantes
2006/0263519 A1 11/2006 Schwantes
2006/0263898 A1 11/2006 Paget
2006/0275237 A1 12/2006 Bissett
2006/0292098 A1 12/2006 Scavone
2007/0020205 A1 1/2007 Blin
2007/0031463 A1 2/2007 Fotinos
2007/0041929 A1 2/2007 Torgerson
2007/0048339 A1 3/2007 Popplewell
2007/0071781 A1 3/2007 Louys
2007/0071978 A1 3/2007 Sojka
2007/0078071 A1 4/2007 Lee
2007/0122481 A1 5/2007 Liversidge
2007/0123442 A1 5/2007 Holzner
2007/0134411 A1 6/2007 Cont
2007/0136328 A1 6/2007 Carro
2007/0138671 A1 6/2007 Anastasiou
2007/0138672 A1 6/2007 Lee
2007/0138673 A1 6/2007 Lee
2007/0138674 A1 6/2007 Anastasiou
2007/0160561 A1 7/2007 Ouali
2007/0160675 A1 7/2007 Devane
2007/0173433 A1 7/2007 Heibel
2007/0202063 A1 8/2007 Dihora
2007/0207109 A1 9/2007 Peffly
2007/0207174 A1 9/2007 Pluyter
2007/0224274 A1 9/2007 Siol
2007/0224395 A1 9/2007 Rowitsch et al.
2007/0248553 A1 10/2007 Scavone
2007/0286837 A1 12/2007 Torgerson
2007/0286904 A1 12/2007 Popplewell
2007/0292361 A1 12/2007 Virgallito
2007/0298061 A1 12/2007 Boghani
2008/0008750 A1 1/2008 Tochio
2008/0032909 A1 2/2008 De Buzzaccarini
2008/0040082 A1 2/2008 Stanton
2008/0057021 A1 3/2008 Dykstra
2008/0061459 A1 3/2008 Nakajima
2008/0102121 A1 5/2008 Devane
2008/0107615 A1 5/2008 Keene
2008/0113025 A1 5/2008 Devane
2008/0118556 A1 5/2008 Devane
2008/0128941 A1 6/2008 Lopez
2008/0182774 A1 7/2008 Naraschkewitz
2008/0187596 A1 8/2008 Dihora
2008/0199503 A1 8/2008 Camargo
2008/0200359 A1 8/2008 Smets

(56) References Cited

U.S. PATENT DOCUMENTS

2008/0200363 A1 8/2008 Smets
2008/0213451 A1 9/2008 Ogura
2008/0226684 A1 9/2008 Peppas
2008/0234406 A1 9/2008 Rawlins
2008/0305982 A1 12/2008 Smets
2008/0311064 A1 12/2008 Lei
2008/0317788 A1 12/2008 Louzan
2008/0318788 A1 12/2008 Nadian
2009/0010864 A1 1/2009 Banowski et al.
2009/0022764 A1 1/2009 Frater
2009/0023189 A1 1/2009 Lau
2009/0029900 A1 1/2009 Cetti
2009/0035365 A1 2/2009 Popplewell
2009/0047434 A1 2/2009 Trophardy
2009/0053165 A1 2/2009 Brown
2009/0081265 A1 3/2009 Peppas
2009/0118399 A1 5/2009 Benbakoura
2009/0120526 A1 5/2009 Berktold
2009/0142444 A1 6/2009 Jarrard, Jr.
2009/0149479 A1 6/2009 Jenkins
2009/0202465 A1 8/2009 Mougin
2009/0209661 A1 8/2009 Somerville
2009/0221463 A1 9/2009 Kitko
2009/0226529 A1 9/2009 Quellet et al.
2009/0232857 A1 9/2009 Peppas
2009/0232858 A1 9/2009 Peppas
2009/0247449 A1 10/2009 Burdis
2009/0252789 A1 10/2009 Trophardy
2009/0258042 A1 10/2009 Anastasiou
2009/0258812 A1 10/2009 Sengupta
2009/0274905 A1 11/2009 Schwantes
2009/0274906 A1 11/2009 Schwantes
2009/0274907 A1 11/2009 Schwantes
2009/0275494 A1 11/2009 Ferguson
2009/0289216 A1 11/2009 Jung
2009/0324660 A1 12/2009 Cetti
2010/0003518 A1 1/2010 Grey
2010/0029537 A1 2/2010 Dihora et al.
2010/0040884 A1 2/2010 Smets
2010/0056414 A1 3/2010 Smith
2010/0061954 A1 3/2010 Adams
2010/0068163 A1 3/2010 Lu
2010/0068525 A1 3/2010 Willax
2010/0104611 A1 4/2010 Chan
2010/0104612 A1 4/2010 Cropper
2010/0104613 A1 4/2010 Chan
2010/0119679 A1 5/2010 Dihora
2010/0179088 A1 7/2010 Flachsmann et al.
2010/0190674 A1 7/2010 Smets et al.
2010/0216684 A1 8/2010 Ferguson
2010/0275384 A1 11/2010 Broze
2010/0286018 A1 11/2010 Hentze
2010/0297446 A1 11/2010 Oxley
2011/0003152 A1 1/2011 Grey
2011/0005001 A1 1/2011 Robles
2011/0008427 A1 1/2011 Biggs
2011/0008435 A1 1/2011 Devane
2011/0020416 A1 1/2011 Pluyter
2011/0021408 A1 1/2011 Meek et al.
2011/0033513 A1 2/2011 Lei
2011/0086788 A1 4/2011 Smets
2011/0093246 A1 4/2011 Stanton
2011/0104221 A1 5/2011 Galeone et al.
2011/0110997 A1 5/2011 Cunningham et al.
2011/0111999 A1 5/2011 Smets
2011/0152147 A1 6/2011 Smets
2011/0239377 A1 10/2011 Fossum et al.
2011/0239378 A1 10/2011 Fossum et al.
2011/0245139 A1 10/2011 Koehle et al.
2011/0245140 A1 10/2011 Demeyere
2011/0245141 A1 10/2011 Gizaw
2011/0267702 A1 11/2011 Fujimoto
2011/0268778 A1 11/2011 Dihora
2011/0268802 A1 11/2011 Dihora
2011/0269657 A1 11/2011 Dihora
2011/0269658 A1 11/2011 Dihora
2011/0294715 A1 12/2011 Smets
2011/0306116 A1 12/2011 Jin
2012/0010120 A1 1/2012 Somerville
2012/0053108 A1 3/2012 Glenn, Jr.
2012/0071391 A1 3/2012 Smets
2012/0076839 A1 3/2012 Chan
2012/0114582 A1 5/2012 Batchelor
2012/0121677 A1 5/2012 Franklin
2012/0152268 A1 6/2012 York
2012/0177924 A1 7/2012 Jung
2012/0258150 A1 10/2012 Rauckhorst
2012/0276175 A1 11/2012 Dihora
2012/0276210 A1 11/2012 Dihora
2012/0282309 A1 11/2012 Dihora
2012/0322709 A1 12/2012 Li
2013/0039962 A1 2/2013 Smets
2013/0137625 A1 5/2013 Stowell
2013/0203644 A1 8/2013 Lant
2013/0245153 A1 9/2013 Schwantes
2013/0296211 A1 11/2013 Smets
2013/0302392 A1 11/2013 Mistry
2014/0037703 A1 2/2014 Dihora
2014/0079747 A1 3/2014 Dihora
2014/0079748 A1 3/2014 Cetti
2014/0086965 A1 3/2014 Dihora
2014/0127309 A1 5/2014 Drake
2014/0178442 A1 6/2014 Li
2014/0227328 A1 8/2014 Dihora
2014/0338134 A1 11/2014 Fernandez Prieto et al.
2014/0342964 A1 11/2014 Jackson et al.
2014/0342972 A1 11/2014 Smets
2015/0000048 A1 1/2015 Miracle
2015/0017214 A1 1/2015 Warr
2015/0071977 A1 3/2015 Dihora et al.
2015/0086595 A1 3/2015 Dihora
2015/0132377 A1* 5/2015 Reymar ................. C11D 3/001
424/463
2015/0284660 A1* 10/2015 Budijono ............... A61Q 15/00
510/106
2015/0352576 A1 12/2015 Burrowes et al.
2016/0024434 A1 1/2016 Sivik
2016/0108340 A1 4/2016 Feng et al.
2016/0128917 A1 5/2016 Wei
2016/0168509 A1 6/2016 Hitchcock et al.
2016/0184196 A1 6/2016 Baxter
2016/0304817 A1 10/2016 Fernandez Prieto et al.
2017/0002293 A1 1/2017 Dihora
2017/0002301 A1 1/2017 Dihora
2017/0002302 A1* 1/2017 Dihora ..................... A61Q 5/02
2018/0110700 A1* 4/2018 Dihora ................... A61Q 19/00
2018/0215982 A1 8/2018 Zhang et al.
2018/0264425 A1 9/2018 Verstraete et al.
2018/0265811 A1 9/2018 Fernandez Prieto
2018/0265818 A1 9/2018 Smets
2018/0265827 A1 9/2018 Oh
2018/0289597 A1 10/2018 Baxter
2018/0333341 A1 11/2018 Nijakowski et al.
2018/0360706 A1 12/2018 Dihora
2018/0362892 A1 12/2018 Beckholt
2019/0062676 A1 2/2019 Ott
2019/0091115 A1 3/2019 Nijakowski et al.
2019/0142714 A1 5/2019 Dihora
2020/0002653 A1 1/2020 Smets
2020/0002654 A1 1/2020 Smets
2020/0181543 A1 6/2020 Smets
2020/0222873 A1 7/2020 Neuman et al.
2020/0283704 A1 9/2020 Smets
2020/0283705 A1 9/2020 Smets
2020/0330937 A1 10/2020 Rodrigo-Gomez et al.
2020/0330951 A1 10/2020 Rodrigo-Gomez et al.
2020/0330952 A1 10/2020 Rodrigo-Gomez et al.
2020/0407665 A1 12/2020 Joos
2021/0252469 A1* 8/2021 Feng ........................ B01J 13/22
2021/0339217 A1* 11/2021 Feng .................... C11D 3/3726

(56) References Cited

U.S. PATENT DOCUMENTS

| | | | | |
|---|---|---|---|---|
| 2022/0151902 | A1* | 5/2022 | Denigot | A61Q 13/00 |
| 2023/0159863 | A1 | 5/2023 | Chakar et al. | |

FOREIGN PATENT DOCUMENTS

| | | | |
|---|---|---|---|
| DE | 10062585 | A1 | 6/2002 |
| DE | 102006058253 | A1 | 6/2008 |
| DE | 10200803501 | A1 | 1/2010 |
| DE | 102008044700 | A1 | 2/2010 |
| EP | 0523287 | A1 | 1/1993 |
| EP | 0820762 | A1 | 1/1998 |
| EP | 0829259 | A1 | 3/1998 |
| EP | 1034705 | A2 | 9/2000 |
| EP | 1243318 | A1 | 9/2002 |
| EP | 1243320 | A1 | 9/2002 |
| EP | 1247568 | A1 | 10/2002 |
| EP | 1600151 | A1 | 11/2005 |
| EP | 1702674 | A1 | 9/2006 |
| EP | 1850887 | B1 | 7/2008 |
| EP | 2132294 | B1 | 9/2012 |
| EP | 2090284 | B1 | 12/2012 |
| EP | 2620211 | A2 | 7/2013 |
| EP | 2938429 | A1 | 11/2015 |
| EP | 3375858 | A1 | 9/2018 |
| EP | 2433617 | B1 | 5/2019 |
| FR | 2702961 | A1 | 9/1994 |
| FR | 2881048 | A1 | 7/2006 |
| GB | 1451411 | A | 10/1976 |
| GB | 1478788 | A | 7/1977 |
| GB | 1546480 | A | 5/1979 |
| GB | 2062570 | A | 5/1981 |
| GB | 2217603 | A | 11/1989 |
| GB | 2274989 | B | 3/1997 |
| GB | 2334724 | A | 9/1999 |
| JP | S545051 | A | 1/1979 |
| JP | S5819261 | A | 2/1983 |
| JP | 59139268 | A | 8/1984 |
| JP | 61244366 | A | 10/1986 |
| JP | 62116506 | A | 5/1987 |
| JP | 01256965 | A | 10/1989 |
| JP | 02052661 | A | 2/1990 |
| JP | H0236803 | A | 2/1990 |
| JP | 04021513 | A | 1/1992 |
| JP | 04082558 | A | 3/1992 |
| JP | 04156851 | A | 5/1992 |
| JP | 05017338 | A | 1/1993 |
| JP | 06000361 | A | 1/1994 |
| JP | H0641576 | U | 6/1994 |
| JP | 07075666 | A | 3/1995 |
| JP | 07305049 | A | 11/1995 |
| JP | H07303829 | A | 11/1995 |
| JP | H10195478 | A | 7/1998 |
| JP | 10231119 | A | 9/1998 |
| JP | 2000079337 | A | 3/2000 |
| JP | 2000218154 | A | 8/2000 |
| JP | 2001049287 | A | 2/2001 |
| JP | 2002326904 | A | 11/2002 |
| JP | 2003099986 | A | 4/2003 |
| JP | 2003161893 | A | 6/2003 |
| JP | 2004083475 | A | 3/2004 |
| JP | 2004099743 | A | 4/2004 |
| JP | 2005194308 | A | 7/2005 |
| JP | 2007016161 | A | 1/2007 |
| JP | 2008156565 | A | 7/2008 |
| JP | 2009035454 | A | 2/2009 |
| JP | 2009280533 | A | 12/2009 |
| JP | 2009290236 | A | 12/2009 |
| JP | 2017080651 | A | 5/2017 |
| JP | 2018522975 | A | 8/2018 |
| KR | 20090082704 | A | 7/2009 |
| KR | 20150100309 | A | 9/2015 |
| WO | 8403630 | A1 | 9/1984 |
| WO | 9308600 | A1 | 4/1993 |
| WO | 93/22417 | A1 | 11/1993 |
| WO | 9747720 | A2 | 12/1997 |
| WO | 9812298 | A2 | 3/1998 |
| WO | 9826808 | A2 | 6/1998 |
| WO | 9844084 | A1 | 10/1998 |
| WO | 9917736 | A1 | 4/1999 |
| WO | 9921532 | A1 | 5/1999 |
| WO | 9924159 | A1 | 5/1999 |
| WO | 9948479 | A1 | 9/1999 |
| WO | 0032601 | A2 | 6/2000 |
| WO | 0041528 | A2 | 7/2000 |
| WO | 0065019 | A1 | 11/2000 |
| WO | 0067718 | A1 | 11/2000 |
| WO | 200065020 | A1 | 11/2000 |
| WO | 0141915 | A1 | 6/2001 |
| WO | 0162376 | A1 | 8/2001 |
| WO | 0174310 | A2 | 10/2001 |
| WO | 03002248 | A1 | 1/2003 |
| WO | 03020867 | A1 | 3/2003 |
| WO | 2004006967 | A1 | 1/2004 |
| WO | 2004060418 | A1 | 7/2004 |
| WO | 2004096895 | A2 | 11/2004 |
| WO | 2005047232 | A1 | 5/2005 |
| WO | 2005055990 | A1 | 6/2005 |
| WO | 2006027664 | A2 | 3/2006 |
| WO | 2007040517 | A1 | 4/2007 |
| WO | 2007128326 | A1 | 11/2007 |
| WO | 2007137441 | A1 | 12/2007 |
| WO | 2008005693 | A2 | 1/2008 |
| WO | 2008016637 | A1 | 2/2008 |
| WO | 2008129028 | A1 | 10/2008 |
| WO | 2008145874 | A1 | 12/2008 |
| WO | 2008104352 | A3 | 1/2009 |
| WO | 2009047127 | A1 | 4/2009 |
| WO | 2009080695 | A1 | 7/2009 |
| WO | 2009095823 | A1 | 8/2009 |
| WO | 2009093812 | A3 | 10/2009 |
| WO | 2009150017 | A1 | 12/2009 |
| WO | 2010009976 | A2 | 1/2010 |
| WO | 2010079458 | A3 | 1/2011 |
| WO | 2011054389 | A1 | 5/2011 |
| WO | 2011056935 | A1 | 5/2011 |
| WO | 2012022034 | A1 | 2/2012 |
| WO | 2012022736 | A1 | 2/2012 |
| WO | 2013026657 | A1 | 2/2013 |
| WO | 2014029695 | A1 | 2/2014 |
| WO | 2014104369 | A1 | 3/2014 |
| WO | 2014189906 | A2 | 11/2014 |
| WO | 2015041791 | A1 | 3/2015 |
| WO | 2015070228 | A1 | 5/2015 |
| WO | 2015191517 | A1 | 12/2015 |
| WO | 2016014733 | A1 | 1/2016 |
| WO | 2017004339 | A1 | 1/2017 |
| WO | 2017058875 | A1 | 4/2017 |
| WO | 2020118020 | A1 | 6/2020 |
| WO | 2020214875 | A1 | 10/2020 |
| WO | 2020214891 | A1 | 10/2020 |

OTHER PUBLICATIONS

Cheng et al., "Preparation of monodisperse poly(N-isopropylacrylamide) microspheres and microcapsules via Shirasu-porous-glass membrane emulsification", Science Direct, Desalination 234, 2008, pp. 184-194.

Database WPI, week 201566, Thompson Scientific, London GB, AN 2015-53862D, XP002794945.

Database WPI, week 201566, Thompson Scientific, London GB, AN 2015-53862D, XP002799564.

Fernandes et al., "Influence of Spray Drying Operating Conditions on Microencapsulated Rosemary Essential Oil Properties", Ciência e Tecnologia de Alimentos, vol. 33, Suppl. 1, 2013, pp. 171-178.

Fowkes, F.M., "Attractive Forces at Interfaces", Industrial and Engineering Chemistry, vol. 56, No. 12, 1964, pp. 40-52.

Good, et al, A Theory for Estimation of Surface and Interfacial Energies, III, Estimation of Surface Energies or Solids from Contact Angle Data, The Journal of Physical Chemistry, vol. 64, May 1960, pp. 561-565.

Herbig, James A., "Microencapsulation", Kirk Othmer Encyclopedia of Chemical Technology, vol. 13, Second Edition, pp. 436-456.

(56) References Cited

OTHER PUBLICATIONS

Huber et al, "Capsular Adhesives", Tappi, vol. 49, No. 5, May 1966, pp. 41A-44A.
Jyothi et al, "Microencapsulation techniques, factors influencing encapsulation efficiency", Journal of Microencapsulation, 27:3, pp. 187-197.
Ichemco, Selvol 540, Mar. 14, 2013., 1 page.
Leo et al, "Methods of Calculating Partition Coefficients", Comprehensive Medicinal Chemistry, vol. 4, 1990, pp. 295-319.
Sekisui: Selvol Polyvinyl Alcohol—A Versatile High Performance Polymer; Mar. 30, 2015, pp. 1-9, XP055422301, retrieved from the Internet: URL: http://www. sekisui-sc.com/wp-content/uploads/SelvolPVOH_Brochure_EN.pdf [retrieved on Nov. 7, 2017] the whole document.
Takenaka et al., "Preparation of enteric-coated microcapsules for tableting by spray-drying technique and In Vitro simulation of drug release from the tablet in GI tract", Journal of Pharmaceutical Sciences, vol. 69, Issue 12, Dec. 1980, pp. 1388-1392.
Thompson et al., "Colloidosomes: Synthesis, properties and applications", Journal of Colloid and Interface Science, 447, 2015, pp. 217-228.
U.S. Appl. No. 17/500,974, filed Oct. 14, 2021, to Johan Smets et al.
U.S. Appl. No. 17/500,978, filed Oct. 14, 2021, to Johan Smets et al.
Uppalapati et el., "Effect of External Lubricant on Mechanical Properties of Dry-Pressed Green Bodies", Journal of the American Ceramic Society, 2005, vol. 88, No. 6, pp. 1397-1402.
Vladisavljevic et al., "Recent developments in manufacturing emulsions and particulate products using membranes", Advances in Colloid and Interface Science, vol. 113, No. 1, Mar. 17, 2005, pp. 1-20.
Washburn, Edward W., "The Dynamics of Capillary Flow", Physical Review Journals, vol. 17, No. 3, 1921, pp. 374-375.
Xie et al., "The Effects of Rheological Properties of Wall Materials on Morphology and Particle Size Distribution of Microcapsulein Czech", Journal of Food Science, 2010, vol. 28, No. 5, pp. 433-439.
Zhang, Z. et al, "Mechanical Properties of Melamine-FormaldehydeMicrocapsules", Journal of Microencapsulation, vol. 18, No. 5, 2001, pp. 593-602.
Zim's Crack Creme (R),2003, Perfects Products, Inc., Berlin Center, Ohio 44401, pp. 1-3.

* cited by examiner

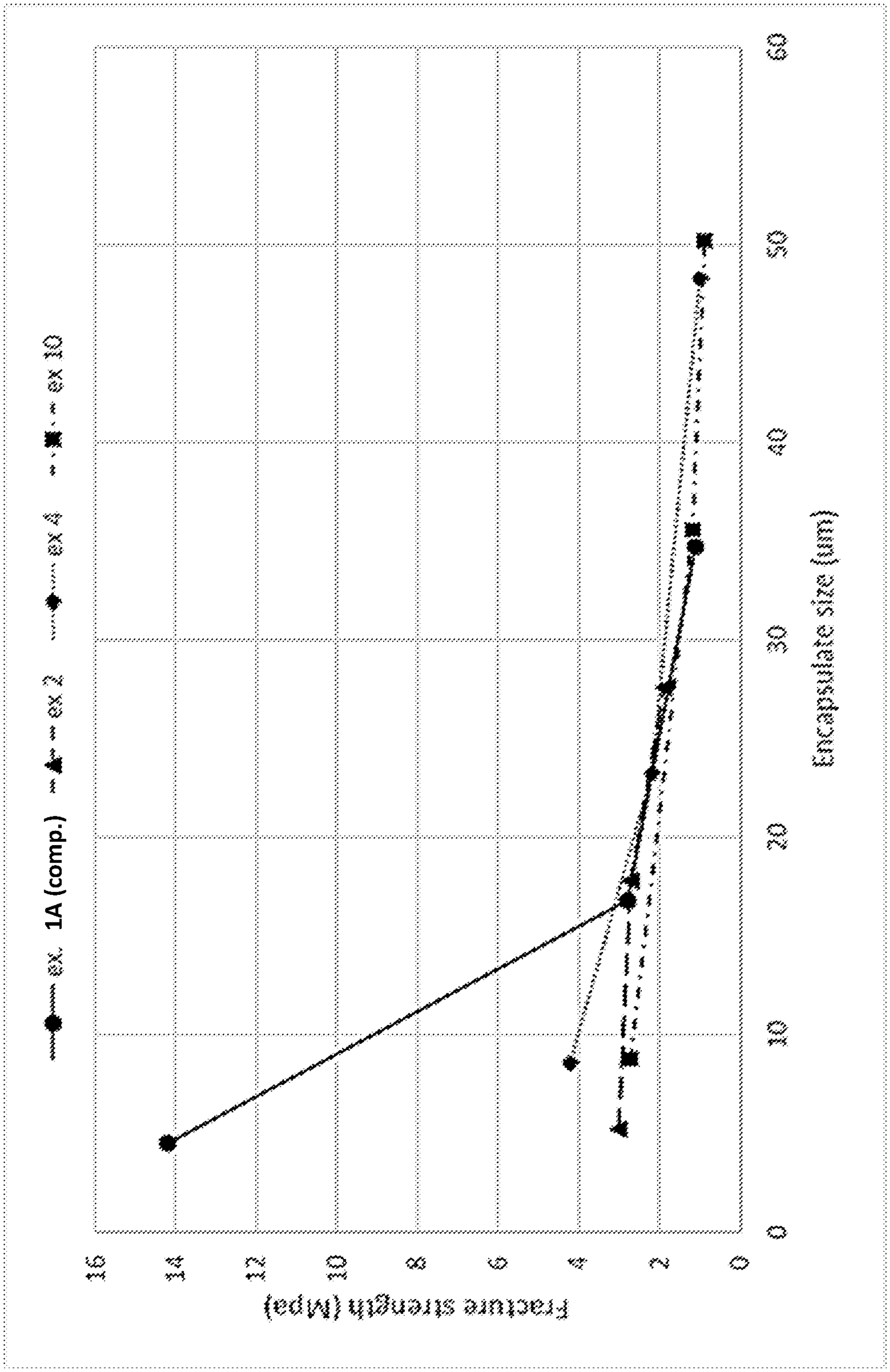
ex. 1A (comp.)
ex 2
ex 4
ex 10
Fracture strength (Mpa)
Encapsulate size (um)
0
2
4
6
8
10
12
14
16
0
10
20
30
40
50
60

CONSUMER PRODUCT COMPOSITIONS WITH AT LEAST TWO ENCAPSULATE POPULATIONS

FIELD OF THE INVENTION

The present disclosure relates to consumer product compositions, such as fabric care compositions, that include first and second populations of encapsulates, where at least one of the populations is characterized by a relatively high core:shell weight ratio. The present disclosure also relates to methods related to the use and making of such compositions.

BACKGROUND OF THE INVENTION

Many consumer product compositions include encapsulated benefit agents. Such encapsulates, which may be core/shell encapsulates, can help to improve the delivery efficiency, stability, and/or performance of the benefit agent.

Encapsulates may be characterized by fracture strength. Fracture strength is a measure of how much pressure is required to rupture the encapsulate, thereby releasing benefit agent. Fracture strength can be used to help predict at what consumer touchpoint a encapsulate will rupture.

Additionally, the encapsulates can be characterized by particle size. The size of the encapsulate may impact delivery or deposition efficiency on a target surface. For example, encapsulates can deposit onto a target fabric, at least in part, through a filtration mechanism, where encapsulates of a certain size become entrapped by the fabric's fibers during a wash or rinse cycle, while other encapsulates pass through. Thus, it is believed that a given fabric is more likely to entrap encapsulates of certain sizes more than other sizes.

However, it is believed that encapsulates of approximately the same size in a given population are likely to be characterized by similar fracture strengths. When encapsulates are characterized by similar fracture strengths, they are likely to rupture at similar touchpoints. This can mean that when a treated surface, such as a fabric, comprises encapsulates of similar sizes and fracture strengths, performance at certain touchpoints may be sufficient, while performance at other touchpoints may be lacking.

There is a need for encapsulate-containing consumer product compositions that provide desirable performance across a variety of consumer touchpoints.

SUMMARY OF THE INVENTION

The present disclosure relates to consumer product compositions, such as fabric, home, or hair care compositions, that include at least two populations of encapsulates that include benefit agents in their cores.

For example, the present disclosure relates to a consumer product composition that includes: a first population of first encapsulates having a first core material surrounded by a first shell material, where the first core material includes a first benefit agent, where the first core material and the first shell material are present in a first core:shell weight ratio of 95:5 or greater; and a second population of second encapsulates having a second core material surrounded by a second shell material, where the second core material includes a second benefit agent, where the second core material and the second shell material are present in a second core:shell weight ratio of less than 95:5.

The present disclosure also relates to a consumer product composition that includes: a first population of first encapsulates having a first core material surrounded by a first shell material, where the first core material includes a first benefit agent, where the first core material and the first shell material are present in a first core:shell weight ratio of 95:5 or greater, and where first encapsulates of a predetermined size are characterized by a first fracture strength; and a second population of second encapsulates having a second core material surrounded by a second shell material, the second core material comprising a second benefit agent, where second encapsulates of the predetermined size are characterized by a second fracture strength, where the difference between the first fracture strength and the second fracture strength is at least 0.5 MPa, preferably at least 1.0 MPa, more preferably at least 1.5 MPa, even more preferably at least 2.0 MPa, even more preferably at least 3 MPa.

The present disclosure also relates to a consumer product composition that includes: a first population of first encapsulates having a first core material surrounded by a first shell material, where the first core material includes a first benefit agent, where the first wall material is derived, at least in part, from a hexafunctional (meth)acrylate monomer; a second population of second encapsulates having a second core material surrounded by a second shell material, where the second core material includes a second benefit agent, where the second wall material is derived, at least in part, from a trifunctional (meth)acrylate monomer; where the first and second populations of PMCs are each independently characterized by a volume-weighted median particle size of from between about 10 um to about 50 um.

The present disclosure also relates to a method of treating a surface, where the method includes contacting the surface with a consumer product composition according to the present disclosure, optionally in the presence of water.

BRIEF DESCRIPTION OF THE DRAWINGS

The FIGURES herein are illustrative in nature and are not intended to be limiting.

FIG. 1 shows a graph, where the encapsulate sizes at d5, d50, and d90 of various encapsulate populations are graphed against the respective Fracture Strengths.

DETAILED DESCRIPTION OF THE INVENTION

The present disclosure relates to consumer product compositions that include two or more populations of encapsulates. The populations are selected so that similarly sized encapsulates selected from each population are characterized by different fracture strengths.

This is achieved by providing a first encapsulate population that comprises encapsulates having a relatively high weight ratio of core material to shell material, for example of 95:5 or more. A second encapsulate population may include encapsulates having a relatively lower core:shell weight ratio.

Without wishing to be bound by theory, it is believed that selecting the proper core:wall weight ratio of one or both encapsulate populations can provide a consumer product composition that provides improved performance over a variety of consumer touchpoints, compared to a composition comprising only one encapsulate population or the other, or even certain combinations of encapsulate populations. Additionally, selecting the high core:shell weight ratios of at least the first population, and optionally the volume-weighted median particle size, can provide a mass-efficient delivery system that performs well, particularly at "dry" and "rubbed" fabric touchpoints.

The components, compositions, and processes of the present disclosure are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein "consumer product," means baby care, beauty care, fabric & home care, family care, feminine care, and/or health care products or devices intended to be used or consumed in the form in which it is sold, and not intended for subsequent commercial manufacture or modification. Such products include but are not limited to diapers, bibs, wipes; products for and/or methods relating to treating human hair, including bleaching, coloring, dyeing, conditioning, shampooing, styling; deodorants and antiperspirants; personal cleansing; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; tampons, feminine napkins; adult incontinence products; products and/or methods relating to oral care including toothpastes, tooth gels, tooth rinses, denture adhesives, tooth whitening; over-the-counter health care including cough and cold remedies; pest control products; and water purification.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, reference to the term "(meth)acrylate" or "(meth)acrylic" is to be understood as referring to both the acrylate and the methacrylate versions of the specified monomer, oligomer and/or prepolymer. For example, "allyl (meth)acrylate" indicates that both allyl methacrylate and allyl acrylate are possible, similarly reference to alkyl esters of (meth)acrylic acid indicates that both alkyl esters of acrylic acid and alkyl esters of methacrylic acid are possible, similarly poly(meth)acrylate indicates that both polyacrylate and polymethacrylate are possible. Poly(meth)acrylate materials are intended to encompass a broad spectrum of polymeric materials including, for example, polyester poly (meth)acrylates, urethane and polyurethane poly(meth)acrylates (especially those prepared by the reaction of an hydroxy alkyl (meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl (meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, diglycerol di(meth)acrylate, tetraethylene glycol dichloroacrylate, 1,3-butanediol di(meth)acrylate, neopentyl di(meth)acrylate, trimethylolpropane tri(meth) acrylate, and various multifunctional(meth)acrylates. Monofunctional (meth)acrylates, i.e., those containing only one (meth)acrylate group, may also be advantageously used. Typical mono(meth)acrylates include 2-ethylhexyl (meth) acrylate, 2-hydroxyethyl (meth)acrylate, cyanoethyl (meth) acrylate, 2-hydroxypropyl (meth)acrylate, p-dimethylaminoethyl (meth)acrylate, lauryl (meth)acrylate, cyclohexyl (meth)acrylate, tetrahydrofurfuryl (meth)acrylate, chlorobenzyl (meth)acrylate, aminoalkyl (meth)acrylate, various alkyl(meth)acrylates and glycidyl (meth)acrylate. Mixtures of (meth)acrylates or their derivatives as well as combinations of one or more (meth)acrylate monomers, oligomers and/or prepolymers or their derivatives with other copolymerizable monomers, including acrylonitriles and methacrylonitriles may be used as well.

As used herein, "delivery particles," "particles," "encapsulates," "microcapsules," and "capsules" are used interchangeably, unless indicated otherwise.

For ease of reference in this specification and in the claims, the term "monomer" or "monomers" as used herein with regard to the wall polymer is to be understood as monomers but also is inclusive of oligomers or monomers, and prepolymers formed of the specific monomers.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Consumer Product Composition

The present disclosure relates to consumer product compositions (or simply "compositions" as used herein). The compositions of the present disclosure may comprise first and second populations of encapsulates, described in more detail below. The compositions may further comprise a consumer adjunct ingredient.

The consumer products compositions of the present disclosure may be useful in baby care, beauty care, fabric care, home care, family care, feminine care, and/or health care applications. The consumer product compositions may be useful for treating a surface, such as fabric, hair, or skin. The consumer product compositions may be intended to be used or consumed in the form in which it is sold. The consumer product compositions may be not intended for subsequent commercial manufacture or modification.

The consumer product composition may be a fabric care composition, a hard surface cleaner composition, a dish care composition, a hair care composition, a body cleansing composition, or a mixture thereof.

The consumer product may be a fabric care composition, such as a laundry detergent composition (including a heavy-duty liquid washing detergent or a unit dose article), a fabric conditioning composition (including a liquid fabric softening and/or enhancing composition), a laundry additive, a fabric pre-treat composition (including a spray, a pourable liquid, or a spray), a fabric refresher composition (including a spray), or a mixture thereof.

The consumer product composition may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The composition may be in the form of a liquid. The liquid composition may include from about 30%, or from about 40%, or from about 50%, to about 99%, or to about 95%, or to about 90%, or to about 75%, or to about 70%, or to about 60%, by weight of the composition, of water. The liquid composition may be a liquid laundry detergent, a liquid fabric conditioner, a liquid dish detergent, a hair shampoo, a hair conditioner, or a mixture thereof.

The composition may be in the form of a solid. The solid composition may be a powdered or granular composition. Such compositions may be agglomerated or spray-dried. Such composition may include a plurality of granules or particles, at least some of which include comprise different compositions. The composition may be a powdered or granular cleaning composition, which may include a bleaching agent. The composition may be in the form of a bead or pastille, which may be pastilled from a liquid melt. The composition may be an extruded product.

The composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may be in the form of a spray and may be dispensed, for example, via a trigger sprayer and/or an aerosol container with a valve.

The composition may have a viscosity of from 1 to 1500 centipoises (1-1500 mPa*s), from 100 to 1000 centipoises (100-1000 mPa*s), or from 200 to 500 centipoises (200-500 mPa*s) at 20 $s^{-1}$ and 21° C.

Additional components and/or features of the compositions, such as encapsulates and consumer product adjunct materials, are discussed in more detail below.

Encapsulates

The consumer product compositions of the present disclosure may comprise a first population of encapsulates and a second population of encapsulates. Generally, the encapsulates of both populations are core/shell encapsulates, where a core is surrounded by a shell. Typically, the core comprises a core material that comprises a benefit agent. The shell includes a shell material, which may comprise a polymeric material.

The composition may comprise from about 0.05% to about 20%, or from about 0.05% to about 10%, or from about 0.1% to about 5%, or from about 0.2% to about 2%, by weight of the composition, of encapsulates in total. The composition may comprise a sufficient amount of total encapsulates to provide from about 0.05% to about 10%, or from about 0.1% to about 5%, or from about 0.1% to about 2%, by weight of the composition, of benefit agent, preferably perfume, to the composition. When discussing herein the amount or weight percentage of the encapsulates, it is meant the sum of the shell material and the core material.

The first and second populations of encapsulates may be present in any suitable ratio. That being said, it may be desirable for the encapsulates, or for the benefit agents delivered by the encapsulates, to be present in somewhat similar amounts, so that the performance at the different touchpoints is somewhat consistent.

For example, the consumer product composition may comprise the first population and the second population in a weight ratio of from about 1:10 to about 10:1, or from about 1:5 to about 5:1, or from about 1:3 to about 3:1, or from about 1:2 to about 2:1, or from about 1:1.5 to about 1.5:1, or about 1:1.

Because the encapsulates of the first and second populations may respectively comprise different amounts of the encapsulated benefit agents, weight ratios may be provided in terms of the benefit agent present. For example, the first and second populations may be present in amounts sufficient to provide a weight ratio of a first benefit agent (located in the encapsulates of the first population) to a second benefit agent (located in the encapsulates of the second population) in a range of from about 1:10 to about 10:1, or from about 1:5 to about 5:1, or from about 1:3 to about 3:1, or from about 1:2 to about 2:1, or from about 1:1.5 to about 1.5:1, or about 1:1.

The encapsulates of either or both populations may be characterized by a volume-weighted particle size. The first population, the second population, or both may have a volume weighted median encapsulate size from about 0.5 microns to about 100 microns, or even 10 to 100 microns, preferably from about 1 micron to about 60 microns, or even 10 microns to 50 microns, or even 20 microns to 45 microns, or even 20 microns to 60 microns.

The first population of encapsulates may be characterized by a first volume-weighted median particle size. The second population of encapsulates may be characterized by a second volume-weighted median particle size. It may be desirable for the first and second volume-weighted median particle sizes to be relatively similar, which may facilitate the encapsulates depositing on similar surfaces. The difference between the first and second volume-weight median particle sizes may be less than 15 microns, or less than 10 microns, or less than 5 microns, or less than 3 microns. On the other hand, it may be desirable for the first and second volume-weighted median particle sizes to be relatively different, which may facilitate the encapsulates depositing on different surfaces. The difference between the first and second volume-weighted median particle sizes may be greater than 5 microns, or greater than 10 microns, or greater than 15 microns, and preferably less than 50 microns, as encapsulates that are quite different in volume-weighted median particle sizes may not be suitable for use in the same composition.

The first population of encapsulates may be characterized by a first volume-weighted median particle size of from about 30 microns to about 50 microns. In such cases, it may be preferred for performance reasons that the second population of encapsulates is characterized by a second volume-weighted median particle size that is less than the first volume-weighted median particle size, for example wherein the second volume-weighted median particle size is from about 10 microns to about 30 microns. On the other hand, it may be preferred for performance reasons that the second population of encapsulates is characterized by a second volume-weighted median particle size that is similar to the first volume-weighted median particle size, for example also from about 30 microns to about 50 microns.

The volume-weighted particle size can be useful for describing the median size of a population, but other measurements, such as particle diameter, determined by optical microscopy, can be used to describe individual encapsulates.

Encapsulates from one or more populations of a predetermined size may be analyzed for various characteristics, such as fracture strength. In other words, encapsulates of a predetermined size from a first population of encapsulates may be compared to encapsulates of the same predetermined size from a second population. The predetermined size, based on particle diameter, may be from 5 microns to 50 microns, preferably from 5 microns to 45 microns, more preferably from 5 microns to 20 microns, more preferably from 10 microns to 20 microns, most preferably 10 microns. It is believed that particles from different populations according to the present disclosure are more likely to have relatively greater differences, for example in Fracture Strength, at relatively smaller particle sizes.

The encapsulates of either or both populations may be characterized by a fracture strength. Fracture strength is determined according to the procedure provided in the Test Method section below.

The first population of encapsulates, the second population of encapsulates, or both may be characterized by a fracture strength at $d_{50}$ (absolute fracture strength at the median size of the population) of about 0.2 MPa to about 30 MPa, or about 0.4 MPa to about 10 MPa, or about 0.6 MPa to about 5 MPa, or even from about 0.8 MPa to about 4 MPa. The population of encapsulates may be characterized by a fracture strength at $d_{50}$ (absolute fracture strength at the median size of the population) of about 0.2 MPa to about 10 MPa, or from about 0.5 MPa to about 8 MPa, or from about 0.5 MPa to about 6 MPa, or from about 0.5 MPa to about 5 MPa, or from about 0.7 MPa to about 4 MPa, or from about 1 MPa to about 3 MPa. It is believed that encapsulates having a fracture strength at $d_{50}$ at these levels will perform well at one or more touchpoints that are typical for a surface, such as a fabric, treated with a composition according to the present disclosure.

The encapsulates of the first and second populations may be characterized by a difference in fracture strength. The difference may be between the fracture strength at $d_{50}$ of the first population (a first fracture strength) and the fracture strength at $d_{50}$ of the second population (a second fracture strength).

The difference in fracture strength between the first and second populations may be based on a comparison of encapsulates from each population, where the encapsulates being compared are of a predetermined particle size. The first population may comprise first encapsulates of a predetermined size that may be characterized by a first fracture strength. The second population may comprise second encapsulates of the predetermined particle size are characterized by a second fracture strength.

The first fracture strength, the second fracture strength, or both may independently be from about 0.5 to about 10 MPa, preferably from about 0.5 to about 8 MPa, more preferably from about 0.5 to about 5 MPa.

The first fracture strength may be greater than the second fracture strength. The second fracture strength may be greater than the first fracture strength.

As described above, it may be desirable for the first and second fracture strengths to be sufficiently different so that the capsules of each population tend to rupture at different touchpoints or under different forces. Therefore, it may be desirable for the first and second fracture strengths to be different be a certain minimum so that the rupturing forces and/or touchpoints that lead to rupture are noticeably different. It may be desirable for the difference to be capped at a maximum, so that the encapsulates may rupture at consumer-relevant touchpoints. For example, if the fracture strength of a population is too low, the encapsulates may tend to rupture prior to a consumer's usage of the composition; if the fracture strength is too high, the encapsulates may fail to rupture under normal usage patterns.

The difference between the first fracture strength and the second fracture strength may be at least about 0.5 MPa, preferably at least about 1.0 MPa, more preferably at least about 1.5 MPa, even more preferably at least about 2.0 MPa, even more preferably at least about 3 MPa. The difference between the first fracture strength and the second fracture strength may be between about 0.5 MPa and about 15 MPa, or between 1 MPa and about 12 MPa, or between about 1 MPa and about 10 MPa, or between about 1 MPa and about 7.5 MPa, or between about 1 MPa and about 5 MPa, or between about 1 MPa and about 4 MPa, or between about 1 MPa and about 3 MPa, or between about 1 MPa and about 2 MPa.

It may be that the first fracture strength is no greater than 75% of the second fracture strength, preferably from 10% to 75%, more preferably from 10% to 60%, even more preferably from 10% to 50%, greater than the second fracture strength. It may be that the first fracture strength is at least 125%, preferably from 125% to 1000%, more preferably from 150% to 1000%, even more preferably 250% to 1000%, more preferably 200% to 1000%, of the second fracture strength.

a. Core Material

The encapsulates of the present disclosure include a core. The core may comprise a benefit agent. Suitable benefit agents located in the core may include benefit agents that provide benefits to a surface, such as a fabric or hair. The cores of the first population of encapsulates may comprise a first benefit agent, and the cores of the second population of encapsulates may comprise a second benefit agent. The first and second benefit agents may be the same. The first and second benefit agents may be different. For example, the first and second benefit agents may both comprise perfume raw materials, but the perfume raw materials may not be identical in both, and/or may not be present at identical levels.

The core may comprise from about 20% to about 100%, or from about 20% to about 99%, or from about 45% to about 95%, preferably from about 50% to about 80%, more preferably from about 50% to about 70%, by weight of the core, of the benefit agent, which may preferably comprise perfume raw materials.

The benefit agent (including the first benefit agent and/or the second benefit agent) may be selected from the group consisting of perfume raw materials, silicone oils, waxes, hydrocarbons, higher fatty acids, essential oils, lubricants, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, antioxidants, chelants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, glycerin, synthetic or natural actives, antibacterial actives, antiperspirant actives, cationic polymers, dyes and mixtures thereof.

Preferably, the encapsulated benefit agent in the cores of the encapsulates of the first and/or second populations may include perfume raw materials. The term "perfume raw material" (or "PRM") as used herein refers to compounds having a molecular weight of at least about 100 g/mol and which are useful in imparting an odor, fragrance, essence or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail below.

The perfume raw materials may comprise a perfume raw material selected from the group consisting of perfume raw materials having a boiling point (B.P.) lower than about 250° C. and a log P lower than about 3, perfume raw materials having a B.P. of greater than about 250° C. and a log P of greater than about 3, perfume raw materials having a B.P. of greater than about 250° C. and a log P lower than about 3, perfume raw materials having a B.P. lower than about 250° C. and a log P greater than about 3 and mixtures thereof. Perfume raw materials having a boiling point B.P. lower than about 250° C. and a log P lower than about 3 are known as Quadrant I perfume raw materials. Quadrant 1 perfume raw materials are preferably limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials. Suitable Quadrant I, II, III and IV perfume raw materials are disclosed in U.S. Pat. No. 6,869,923 B1.

The first benefit agent, the second benefit agent, or both may comprise perfume raw materials. Preferably, both the first and the second benefit agents comprise perfume raw materials. So as to provide a more complex freshness experience, it may be preferred that the first and second benefit agents comprise different perfume raw materials. As used herein, this may mean that the first benefit agent comprises one or more perfume raw materials that is/are not present in the second benefit agent, or vice versa. Additionally or alternatively, this may mean that the first benefit agent comprises one or more perfume raw materials that is/are present at a level that different from the level of the one or more perfume raw materials found in the second benefit agent.

The core of the encapsulates of the first population, the second population, or both may comprise a partitioning modifier (e.g., isopropyl myristate) in addition to the benefit agent (e.g., perfume). Incorporation of a partitioning modifier can adjust the polarity of the core, thereby changing the partition coefficient of the polar materials in the partitioning modifier versus the shell's monomers or oligomers, and can result in the establishment of a well-defined, highly impermeable shell, particularly when the shell material comprises an acrylate material The partitioning modifier may be combined with the core's perfume oil material prior to incorporation of the wall-forming monomers.

The core may comprise, in addition to the encapsulated benefit agent, from greater than 0% to about 80%, preferably from greater than 0% to about 50%, more preferably from greater than 0% to about 30%, most preferably from greater than 0% to about 20%, based on total core weight, of a partitioning modifier. The partitioning modifier may be present in the core at a level of from about 5% to about 55%, preferably from about 10% to about 50%, more preferably from about 25% to about 50%, by weight of the core.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or even consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described benefit agent encapsulates.

b. Shell Material

The encapsulates of the first and second populations may each comprise a shell that surrounds the core of the encapsulate. To note, as used herein, the terms "shell," "wall," and "polymer wall" are used interchangeably, unless otherwise indicated. The shell comprises a shell material, which typically comprises a polymeric material.

The shells of the encapsulates of the first population may comprise a first shell material. The shells of the encapsulates of the second population may comprise a second material. The first shell material and the second shell material may be the same, or they may be different.

The first shell material, the second shell material, or both may comprise a (meth)acrylate material. Preferably, both the first and second shell materials comprise a (meth)acrylate material. The (meth)acrylate material may be derived, at least in part, from a multifunctional (meth)acrylate monomer or oligomer having at least three, preferably at least four, preferably at least five, preferably at least six, more preferably exactly six, radical polymerizable functional groups, with the proviso that at least one of the radical polymerizable functional groups is an acrylate or methacrylate group. The multifunctional (meth)acrylate monomer or oligomer may be oil-soluble or oil-dispersible. The one or more oil-soluble or oil-dispersible multifunctional (meth) acrylate monomers or oligomers may comprise from three to six, preferably from four to six, more preferably from five to six, most preferably six, radical polymerizable functional groups. radical polymerizable functional groups. It is believed that monomers comprising a relatively greater number of radical polymerizable groups result in, for example, delivery particles with more compact walls and having preferred properties, such as less leakage, compared to walls formed from monomers that have fewer radical polymerizable groups.

The first shell material, the second shell material, or both may comprise from about 5% to about 100%, preferably from about 40% to about 100%, more preferably from about 50% to about 100%, more preferably from about 75% to about 100%, more preferably from about 85% to about 100%, more preferably from about 90% to about 100%, even more preferably from about 95% to about 100%, by weight of the respective shell material, of the (meth)acrylate polymer. The first shell material, the second shell material, or both may comprise from about 5% to about 100%, preferably from about 40% to about 100%, more preferably from about 50% to about 100%, more preferably from about 75% to about 100%, more preferably from about 85% to about 100%, more preferably from about 90% to about 100%, even more preferably from about 95% to about 100%, by weight of the respective shell material, of the oil-soluble or oil-dispersible multifunctional (meth)acrylate monomer or oligomer. The (meth)acrylate polymer may comprise from about 5% to about 100%, preferably from about 40% to about 100%, more preferably from about 50% to about 100%, more preferably from about 75% to about 100%, more preferably from about 85% to about 100%, more preferably from about 90% to about 100%, even more preferably from about 95% to about 100%, by weight of the (meth)acrylate polymer, of the oil-soluble or oil-dispersible multifunctional (meth)acrylate monomer or oligomer.

The radical polymerizable functional groups may be independently selected from the group consisting of acrylate, methacrylate, styrene, allyl, vinyl, glycidyl, ether, epoxy, carboxyl, or hydroxyl, with the proviso that at least one of the radical polymerizable groups is acrylate or methacrylate. Preferably, at least two, or at least three, or at least four, or at least five, or at least six of the radical polymerizable functional groups is an acrylate or methacrylate group. Preferably, the radical polymerizable functional groups are each independently selected from the group consisting of acrylate and methacrylate. It is believed that these functional groups result in delivery particles having preferred properties, such as less leakage at high core:wall ratios, compared to other functional groups.

The (meth)acrylate monomer or oligomer may be a monomer selected from the group consisting of a hexafunctional (meth)acrylate, a trifunctional (meth)acrylate, or mixtures thereof, preferably a hexafunctional aromatic acrylate, an isocyanurate triacrylate, or mixtures thereof, more preferably a hexafunctional aromatic urethane acrylate, a tris (2-hydroxyethyl)isocyanurate triacrylate, or mixtures thereof.

The (meth)acrylate polymer of the polymer wall may be derived from at least two different multifunctional (meth) acrylate monomers, for example first and second multifunctional (meth)acrylate monomers, each of which may preferably be oil-soluble or oil-dispersible. The first multifunctional (meth)acrylate monomer may comprise a different number of radical polymerizable functional groups compared to the second multifunctional (meth)acrylate monomer. For example, the first multifunctional (meth) acrylate monomer may comprise six radical polymerizable functional groups (e.g., hexafunctional), and the second multifunctional (meth)acrylate monomer may comprise less than six radical polymerizable functional groups, such as a number selected from three (e.g., trifunctional), four (e.g., tetrafunctional), or five (e.g., pentafunctional), preferably five. The first and second multifunctional (meth)acrylate monomers may be comprise the same number of radical polymerizable functional groups, such as six (e.g., both monomers are hexafunctional), although the respective monomers are characterized by different structures or chemistries.

In addition to an oil-soluble or oil-dispersible multifunctional (meth)acrylate monomer or oligomer, the (meth) acrylate material of the shell may be further derived from a water-soluble or water-dispersible mono- or multifunctional (meth)acrylate monomer or oligomer, which may include a hydrophilic functional group. The water-soluble or water-dispersible mono- or multifunctional (meth)acrylate monomer or oligomer may be preferably selected from the group consisting of amine (meth)acrylates, acidic (meth)acrylates, polyethylene glycol di(meth)acrylates, ethoxylated monofunctional (meth)acrylates, ethoxylated multi-functional (meth)acrylates, other (meth)acrylate monomers, other (meth)acrylate oligomers, and mixtures thereof.

The first shell material may comprise a first (meth) acrylate material. The second shell material may comprise a second (meth)acrylate material.

The first (meth)acrylate material may be the same as the second (meth)acrylate material, preferably derived, at least in part, from a hexafunctional (meth)acrylate, more preferably from a hexafunctional aromatic acrylate, even more preferably from a hexafunctional aromatic urethane acrylate. Additionally or alternatively, the oil-soluble or oil-dispersible multifunctional (meth)acrylate monomers or oligomers may comprise a multifunctional aliphatic urethane acrylate. The oil-soluble or oil-dispersible (meth)acrylate may further comprise a monomer selected from an amine methacrylate, an acidic methacrylate, or a combination thereof.

The first (meth)acrylate material and the second (meth) acrylate material may derived from different monomers, different ratios of monomers, or a combination thereof. For example, the first (meth)acrylate material may be derived, at least in part, from a hexafunctional (meth)acrylate monomer, and the second (meth)acrylate material may be derived, at least in part, from a tri(meth)acrylate monomer. The first and second populations of encapsulates may each be independently characterized by a volume-weighted median particle size of from between about 10 um to about 50 um. The first core material and the first shell material may be present in a first weight ratio, the second core material and the second shell material may be present in a second weight ratio, and the first weight ratio is greater than the second weight ratio, preferably wherein the first weight ratio is greater than 90:10, more preferably greater than 95:5, and preferably wherein the second weight ratio is about 90:10 or less.

It may be that the first shell material comprises a (meth) acrylate material, and the second shell material does not comprise a (meth)acrylate material. In such cases, the second shell material may comprise a material selected from the group consisting of an aminoplast (such as melamine), polyacrylamide, silicones, silica, polystyrene, polyurea, polyurethanes, gelatin, styrene malic anhydride, polyamides, aromatic alcohols, polyvinyl alcohol, and mixtures thereof. The second shell material preferably comprises an aminoplast, a polyurea, or combinations thereof. If an aminoplast is present in the second shell material, the aminoplast may preferably comprise melamine, more preferably melamine-formaldehyde.

The shell material, particularly when the shell material comprises (meth)acrylate material, preferably the first shell material, may be further derived, at least in part, from at least one free radical initiator, preferably at least two free radical initiators. The at least one free radical initiator may preferably comprise a water-soluble or water-dispersible free radical initiator.

Without wishing to be bound by theory, it is believed that selecting the appropriate amount of initiator relative to total wall material (and/or wall monomers/oligomers) can result in improved capsules. For example, it is believed that levels of initiators that are too low may lead to poor polymer wall formation; levels that are too high may lead to encapsulate walls that have relatively low levels of structural monomers. In either situation, the resulting capsules may be relatively leaky and/or weak. It is further believed that the optimization of encapsulate wall formation, aided by proper selection of relative initiator level, is particularly important for capsules having relatively high core:wall ratios, given that the amount of wall material is relatively low.

Thus, the amount of initiator present may be from about 2% to about 50%, preferably from about 5% to about 40%, more preferably from about 10% to about 40%, even more preferably from about 15% to about 40%, even more preferably from about 20% to about 35%, or more preferably from about 20% to about 30%, by weight of the polymer wall (e.g., wall monomers plus initiators, excluding embedded polymeric emulsifiers, as described herein for core:wall ratios), or by weight of the first shell material, the second shell material, or both. It is believed that relatively higher amounts of initiator within the disclosed ranges may lead to improved, less-leaky capsules. The optimal amount of initiator may vary according to the nature of the core material. The (meth)acrylate polymer of the polymer wall may be derived from a first initiator and a second initiator, wherein the first and second initiators are present in a weight ratio of from about 5:1 to about 1:5, or preferably from about 3:1 to about 1:3, or more preferably from about 2:1 to about 1:2, or even more preferably from about 1.5:1 to about 1:1.5.

One or more free radical initiators can provide a source of free radicals upon activation. Suitable free radical initiators may include peroxy initiators, azo initiators, peroxides, and compounds such as 2,2'-azobismethylbutyronitrile, dibenzoyl peroxide. More particularly, and without limitation, the free radical initiator can be selected from the group of initiators comprising an azo or peroxy initiator, such as peroxide, dialkyl peroxide, alkylperoxide, peroxyester, peroxycarbonate, peroxyketone and peroxydicarbonate, 2,2'-azobis (isobutylnitrile), 2,2'-azobis(2,4-dimethylpentanenitrile), 2,2'-azobis (2,4-dimethylvaleronitrile), 2,2'-azobis(2-methylpropanenitrile), 2,2'-azobis(2-methylbutyronitrile), 1,1'-azobis (cyclohexanecarbonitrile), 1,1'-azobis(cyanocyclohexane), benzoyl peroxide, decanoyl peroxide; lauroyl peroxide; benzoyl peroxide, di(n-propyl)peroxydicarbonate, di(sec-butyl) peroxydicarbonate, di(2-ethylhexyl)peroxydicarbonate, 1,1-dimethyl-3-hydroxybutyl peroxyneodecanoate, a-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethylhexanoyl peroxy)hexane, t-amyl peroxy-2-ethylhexanoate, t-butyl peroxy-2-ethylhexanoate, t-butyl peroxyacetate, di-t-amyl peroxyacetate, t-butyl peroxide, dit-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate, ethyl 3,3-di-(t-amylperoxy)-butyrate, and the like.

When making an encapsulate population, optionally emulsifier may be included, preferably in the water phase, preferably when the shell includes (meth)acrylate material. The emulsifier may be a polymeric emulsifier. Emulsifier can help with further stabilizing the emulsion. In formation of the polymer wall of the encapsulate, the polymeric emulsifier can become entrapped in the polymer wall material. These inclusions of emulsifier into the polymer wall usefully can be used to advantage in modification of polymer wall properties, influencing such attributes as flexibility, leakage, strength, and other properties. Thus, the polymer wall of the delivery particles may further comprise a polymeric emulsifier entrapped in the polymer wall, preferably wherein the polymeric emulsifier comprises polyvinyl alcohol. The benefit agent delivery particle, based on total benefit agent delivery particle weight, may comprise from about 0.5% to about 40%, more preferably 0.8% to 5% of an emulsifier. As indicated below, however, the entrapped polymeric emulsifier is not to be included when determining the core:wall polymer weight ratio.

c. Core:Shell Weight Ratio

As described in more detail above, the encapsulates of the first and second populations comprise a core and a shell surrounding the core. It has surprisingly been found that selecting, among other things, particular ratios, or combinations of ratios, of core material to shell material can result in compositions that show improved performance.

Without wishing to be bound by theory, it is believed that formulating populations of encapsulates where at least one population has a relatively high ratio of core to wall provides populations that have the desirable fracture strength profiles described in the present disclosure. Additionally, encapsulates with a high core:shell ratio can deliver a benefit agent more efficiently, requiring less wall material to deliver the same amount of benefit agent. Further, because the encapsulates have relatively high loading of benefit agent, less encapsulate material may be required for a particular composition, saving cost and/or freeing up formulation space. It is also believed that coupling such encapsulates with other encapsulates, such as those that have relatively lower core: shell ratios, can provide compositions that provide desired performance.

The encapsulate populations of the present disclosure may be characterized by a core-to-polymer-wall weight ratio (also "core:polymer wall ratio," "core-wall ratio," "core: wall ratio," or even "C:W ratio" and the like, as used herein). Relatively high core:wall ratios are typically preferred to increase the delivery efficiency or relatively payload of the particles. However, if the ratio is too high, then the capsule may become too brittle or leaky and provide suboptimal performance.

As used herein, the core:polymer wall ratio is be understood as calculated on the basis of the weight of the reacted wall-forming materials and initiators that constitute the polymer wall, and for purposes of the calculation excludes in the calculation entrapped nonstructural materials, such as entrapped emulsifier. The calculation is based the amounts of the starting inputs, namely the input monomers and initiators. A sample core:wall polymer ratio calculation is illustrated in Example 1 below. If the amounts of starting inputs are not readily available, then the core:wall ratio is determined according to the Analytical Determination of the Core:Wall Ratio procedure provided in the Test Methods section.

For a population of encapsulates, the core material and the shell material may be present in the core:shell weight ratios provided below. The first population may be characterized by a first core:shell weight ratio. The second population may be characterized by a second core:shell weight ratio.

The first population of encapsulates may be characterized by a first core-shell weight ratio of at least about 95:5, preferably at least about 96:4, more preferably at least about 97:3, even more preferably at least about 98:2, even more preferably at least about 99:1. The first population of encapsulates may be characterized by a first core-shell weight ratio of from about 95:5 to about 99.5:0.5, preferably from about 96:4 to about 99:1, more preferably from about 97:3 to about 99:1, even more preferably from about 98:2 to about 99:1. The first core-shell ratio may be from about 96:4 to about 99:1, or from about 96:4 to about 98:2, or from about 97:3 to about 98:2.

The second core-shell ratio may be substantially the same as the first core-shell ratio. Two encapsulate populations with similar ratios, particularly when coupled with similar shell materials, but different benefit agents (such as a first fragrance and a second fragrance, respectively) may result in a richer benefit experiences, as different benefit agents may be released at similar times.

The second core-shell ratio may be different than the first core-shell ratio. Two encapsulate populations with different ratios may result in the release of benefit agents at different touchpoints, which may be preferred. The first and second core-shell ratios may be different, but the first and second shell materials may be the same or similar; such cases may reduce manufacturing complexity and/or increase product compatibility. The first and second core-shell ratios may be different, and the first and second shell materials may be different; different materials and core-shell ratios may allow the manufacturer to tune the product so that benefit agents are released at desirable touchpoints and/or sequences.

The second population of encapsulates may be characterized by a second core-shell weight ratio that is also at least about 95:5, preferably at least about 96:4, more preferably at least about 97:3, even more preferably at least about 98:2, even more preferably at least about 99:1. The second population of encapsulates may be characterized by a second core-shell weight ratio of from about 95:5 to about 99.5:0.5, preferably from about 96:4 to about 99:1, more preferably from about 97:3 to about 99:1, even more preferably from about 98:2 to about 99:1.

The second population of encapsulates may be characterized by a second core-shell weight ratio that is less than the first core-shell weight ratio. For example, the second core material and the second shell material may be present in a second core-shell weight ratio of less than 95:5, preferably less than 92:8, more preferably less than 90:10, even more preferably less than 88:12. The second core material and the second shell material may be present in a second core-shell weight ratio of from about 80:20 to about 95:5, or from about 85:15 to 92:8, or from about 85:5 to about 90:10.

The composition may comprise a first population of encapsulates that are characterized by a (first) core:shell weight ratio of from about 97:3 to about 99:1, preferably from about 98:2 to about 99:1, and a second population of encapsulates that are characterized by a (second) core:shell weight ratio of from about 85:15 to 92:8, preferably from about 85:5 to about 90:10.

d. Shell Coating

The encapsulates of first population, the second population, or both may comprise a coating. The shell may comprise the coating; for example, the coating may be on an outer surface of the shell. The encapsulates may be manufactured and be subsequently coated with a coating material. The coating may be useful as a deposition aid. The coating may comprise a cationic material, such as a cationic polymer.

Non-limiting examples of coating materials include but are not limited to materials selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines and mixtures thereof. The coating material may be a cationic polymer. The coating material may comprise polyvinyl formamide, chitosan, or combinations thereof.

When both the first and second populations comprise coatings, the coating material of the first population (e.g., a first coating material) may be the same or different as the coating material of the second population (e.g., a second coating material).

e. Method of Making Encapsulates

Delivery particles may be made according to known methods, so long as the core:shell ratios described herein are observed. Methods may be further adjusted to arrive at other desirable characteristics described herein, such as volume-weighted particle size, relative amounts of benefit agent and/or partitioning modifier, etc.

For example, the present disclosure relates to a process of making a population of delivery particles comprising a core and a polymer wall encapsulating the core. The process may comprise the step of providing an oil phase. The oil phase may comprise a benefit agent and a partition modifier, as described above. The process may further comprise dissolving or dispersing into the oil phase one or more oil-soluble or dispersible multifunctional (meth)acrylate monomers or oligomers having at least three, and preferably at least four, at least five, or even at least six radical polymerizable functional groups with the proviso that at least one of the radical polymerizable groups is acrylate or methacrylate.

The oil-soluble or dispersible multifunctional (meth)acrylate monomers or oligomers are described in more detail above. Among other things, the oil-soluble or dispersible multifunctional (meth)acrylate monomers or oligomers may comprise a multifunctional aromatic urethane acrylate, preferably a tri-, tetra-, penta-, or hexafunctional aromatic urethane acrylate, or mixtures thereof, preferably comprising a hexafunctional aromatic urethane acrylate. The monomer or oligomer may comprise one or more multifunctional aliphatic urethane acrylates, which may be dissolved or dispersed into the oil phase. The process may further comprise dissolving or dispersing one or more of an amine (meth) acrylate or an acidic (meth)acrylate into the oil phase.

The process may further comprise providing a water phase, which may comprise an emulsifier, a surfactant, or a combination thereof. The process may further comprise the step of dissolving or dispersing into the water phase one or more water-soluble or water-dispersible mono- or multi-functional (meth)acrylate monomers and/or oligomers.

The process may comprising a step of dissolving or dispersing in into the water phase, the oil phases, or both, of one or more amine (meth)acrylates, acidic (meth)acrylates, polyethylene glycol di(meth)acrylates, ethoxylated mono- or multi-functional (meth)acrylates, and/or other (meth) acrylate monomers and/or oligomers.

In general, the oil soluble multifunctional (meth)acrylate monomer is soluble or dispersible in the oil phase, typically soluble at least to the extent of 1 gram in 100 ml of the oil, or dispersible or emulsifiable therein at 22 C. The water soluble multifunctional (meth)acrylate monomers are typically soluble or dispersible in water, typically soluble at least to the extent of 1 gram in 100 ml of water, or dispersible therein at 22 C.

Typically, the oil phase is combined with an excess of the water phase. If more than one oil phase is employed, these generally are first combined, and then combined with the water phase. If desired, the water phase can also comprise one or more water phases that are sequentially combined.

The oil phase may be emulsified into the water phase under high shear agitation to form an oil-in-water emulsion, which may comprise droplets of the core materials dispersed in the water phase. Typically, the amount of shear agitation applied can be controlled to form droplets of a target size, which influences the final size of the finished encapsulates.

The dissolved or dispersed monomers may be reacted by heating or actinic irradiation of the emulsion. The reaction can form a polymer wall at an interface of the droplets and the water phase. The radical polymerizable groups of the multifunctional methacrylate, upon heating, facilitate self-polymerization of the multifunctional methacrylate.

One or more free radical initiators may be provided to the oil phase, the water phase, or both, preferably both. For example, the process may comprise adding one or more free radical initiators to the water phase, for example to provide a further source of free radicals upon activation by heat. The process may comprise adding one or more free radical initiators to the oil phase. The one or more free radical initiators may be added to the water phase, the oil phase, or both in an amount of from greater than 0% to about 5%, by weight of the respective phase. Latent initiators are also contemplated where a first action, particularly a chemical reaction, is needed to transform the latent initiator into an active initiator which subsequently initiates polymerization upon exposure to polymerizing conditions. Where multiple initiators are present, it is contemplated, and preferred, that each initiator be initiated or suitably initiated by a different condition.

Alternatively, the reacting step may be carried out in the absence of an initiator, as it has surprisingly been found that encapsulates may form, even when a free radical initiator is not present.

In the described process, the heating step may comprise heating the emulsion from about 1 hour to about 20 hours, preferably from about 2 hours to about 15 hours, more preferably about 4 hours to about 10 hours, most preferably from about 5 to about 7 hours, thereby heating sufficiently to transfer from about 500 joules/kg to about 5000 joules/kg to said emulsion, from about 1000 joules/kg to about 4500 joules/kg to said emulsion, from about 2900 joules/kg to about 4000 joules/kg to said emulsion.

Prior to the heating step, the emulsion may be characterized by a volume-weighted median particle size of the emulsion droplets of from about 0.5 microns to about 100 microns, even from about 1 microns to about 60 microns, or even from 20 to 50 microns, preferably from about 30 microns to about 50 microns, with a view to forming a population of delivery particles with a volume-weighted target size, for example, of from about 30 to about 50 microns.

The benefit agent may be selected as described above, and is preferably a fragrance that comprises one or more perfume raw materials. The benefit agent may be the primary, or even only component, of the oil phase into which the other materials are dissolved or dispersed.

The partitioning modifier may be selected from the group consisting of isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof, preferably isopropyl myristate. The partitioning modifier may be provided in an amount so as to comprise from about 5% to about 55% by weight of the core of the delivery particle.

As described above, it is desirable for the resulting delivery particles to be characterized by a core to polymer wall weight of from 96:4 to about 99.5:0.5. It is also desirable for the resulting delivery particles to be characterized by a volume-weighted median particle size of from about 30 to about 50 microns.

As a result of the method of making delivery particles provided herein, the delivery particles may be present in an aqueous slurry, for example, the particles may be present in the slurry at a level of from about 20% to about 60%, preferably from about 30% to about 50%, by weight of the slurry. Additional materials may be added to the slurry, such as preservatives, solvents, structurants, or other processing or stability aids. The slurry may comprise one or more perfumes (i.e., unencapsulated perfumes) that are different from the perfume or perfumes contained in the core of the benefit agent delivery particles.

Exemplary synthesis methods that can form encapsulates according the present disclosure are further described in Example 1 below.

Additionally, exemplary processes for making encapsulate populations with core-shell ratios less than 95:5 are disclosed in the art and may be found, for example, in U.S. Pat. No. 8,759,275 (melamine-formaldehyde walls with a cationic coating), in U.S. Pat. No. 9,186,642 (polyacrylate walls), and in US Patent Publication 202/0181543A1 (polyacrylate walls), each of which is incorporated herein by reference.

Adjunct Ingredient

The consumer product compositions of the present disclosure may comprise a consumer product adjunct material. The consumer product adjunct material may provide a benefit in the intended end-use of a composition, or it may be a processing and/or stability aid.

Suitable consumer product adjunct materials may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, structurants, anti-agglomeration agents, coatings, formaldehyde scavengers, and/or pigments.

Depending on the intended form, formulation, and/or end-use, compositions of the present disclosure or may not may not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

a. Surfactants

The compositions of the present disclosure may comprise surfactant. Surfactants may be useful for providing, for example, cleaning benefits. The compositions may comprise a surfactant system, which may contain one or more surfactants.

The compositions of the present disclosure may include from about 1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine).

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branched alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

b. Conditioning Active

The compositions of the present disclosure may include a conditioning active. Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

c. Deposition Aid

The compositions of the present disclosure may comprise a deposition aid. Deposition aids can facilitate deposition of encapsulates, conditioning actives, perfumes, or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof. The cationic polymer may comprise a cationic acrylate.

Deposition aids can be added concomitantly with encapsulates (at the same time with, e.g., encapsulated benefit agents) or directly/independently in the fabric treatment composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

d. Rheology Modifier/Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the encapsulates as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon inc under the tradename Carbopol Aqua 30. Another suitable structurant is sold under the tradename Rheovis CDE, available from BASF.

Process of Making a Composition

The present disclosure relates to processes for making any of the compositions described herein. The process of making a composition, which may be a consumer product, may comprise the step of combining first and second encapsulate populations as described herein with a consumer product adjunct material as described herein.

The first and second encapsulate population may be combined with such one or more consumer product adjuncts materials when the encapsulates are in one or more forms, including a slurry form, neat encapsulate form, and/or spray dried encapsulate form, preferably slurries. The encapsulates may be combined with such consumer product adjuncts materials by methods that include mixing and/or spraying. The first and second encapsulate populations may be added to a base composition that comprises the consumer product adjunct.

The compositions of the present disclosure can be formulated into any suitable form and prepared by any process chosen by the formulator. The encapsulates and adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders.

Method of Treating a Surface or Article

The present disclosure further relates to methods of treating a surface or article with a consumer product composition according to the present disclosure. Such methods may provide cleaning, conditioning, and/or freshening benefits.

Suitable surfaces or articles may include fabrics (including clothing, towels, or linens), hard surfaces (such as tile, porcelain, linoleum or wood floors), dishware, hair, skin, or mixtures thereof.

The method may include a step of contacting a surface or article with a consumer product composition of the present disclosure. The composition may be in neat form or diluted in a liquor, for example, a wash or rinse liquor. The composition may be diluted in water prior, during, or after contacting the surface or article. The surface or article may be optionally washed and/or rinsed before and/or after the contacting step.

The method of treating and/or cleaning a surface or article may include the steps of:

a) optionally washing, rinsing and/or drying the surface or article;

b) contacting the surface or article with a consumer product composition as described herein, optionally in the presence of water;

c) optionally washing and/or rinsing the surface or article; and d) optionally dried by drying passively and/or via an active method such as a laundry dryer.

For purposes of the present invention, washing includes but is not limited to, scrubbing, and mechanical agitation. The fabric may comprise most any fabric capable of being laundered or treated in normal consumer use conditions.

Liquors that may comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1.

Combinations

Specifically contemplated combinations of the disclosure are herein described in the following lettered paragraphs. These combinations are intended to be illustrative in nature and are not intended to be limiting.

A. A consumer product composition comprising: a first population of first encapsulates having a first core material surrounded by a first shell material, the first core material comprising a first benefit agent, wherein the first core material and the first shell material are present in a first core:shell weight ratio of 95:5 or greater, a second population of second encapsulates having a second core material surrounded by a second shell material, the second core material comprising a second benefit agent, wherein the second core material and the second shell material are present in a second core:shell weight ratio of less than 95:5.

B. The consumer product composition according to paragraph A, wherein first encapsulates of a predetermined particle size are characterized by a first fracture strength, wherein second encapsulates of the predetermined particle size are characterized by a second fracture strength, wherein the difference between the first fracture strength and the second fracture strength is at least 0.5 MPa, preferably at least 1.0 MPa, more preferably at least 1.5 MPa, even more preferably at least 2.0 MPa, even more preferably at least 3 MPa.

C. A consumer product composition comprising: a first population of first encapsulates having a first core material surrounded by a first shell material, the first core material comprising a first benefit agent, wherein the first core material and the first shell material are present in a first core:shell weight ratio of 95:5 or greater, wherein first encapsulates of a predetermined size are characterized by a first fracture strength, a second population of second encapsulates having a second core material surrounded by a second shell material, the second core material comprising a second benefit agent, wherein second encapsulates of the predetermined size are characterized by a second fracture strength, wherein the difference between the first fracture strength and the second fracture strength is at least 0.5 MPa, preferably at least 1.0 MPa, more preferably at least 1.5 MPa, even more preferably at least 2.0 MPa, even more preferably at least 3 MPa.

D. The consumer product composition according to any of paragraphs A-C, wherein one of the following is true: the first fracture strength is no greater than 75%, preferably from 10% to 75%, more preferably from 10% to 60%, even more preferably from 10% to 50%, of the second fracture strength; or the first fracture strength is at least 125%, preferably from 125% to 1000%, more preferably from 150% to 1000%, even more preferably 250% to 1000%, more preferably 200% to 1000%, of the second fracture strength.

E. The consumer product composition according to any of paragraphs A-D, wherein the first fracture strength, the second fracture strength, or both are from about 0.5 to about 10 MPa, preferably from about 0.5 to about 8 MPa, more preferably from about 0.5 to about 5 MPa.

F. The consumer product composition according to any of paragraphs A-E, wherein the first core:shell weight ratio is at least 96:4, preferably at least 97:3, more preferably at least 98:2.

G. The consumer product composition according to any of paragraphs A-F, wherein the second core material and the second shell material are present in a second core:shell weight ratio of less than 92:8, preferably less than 90:10, more preferably less than 88:12.

H. The consumer product composition according to any of paragraphs A-G, wherein the first shell material, the second shell material, or both comprise a (meth)acrylate material, preferably both.

I. The consumer product composition according to paragraph H, wherein the (meth)acrylate material is derived, at least in part, from a multifunctional (meth)acrylate monomer or oligomer having at least three radical polymerizable functional groups, with the proviso that at least one, preferably all, of the radical polymerizable groups is acrylate or methacrylate.

J. The consumer product composition according to any of paragraphs H or I, wherein the (meth)acrylate monomer or oligomer is a monomer selected from the group consisting of a hexafunctional (meth)acrylate, a trifunctional (meth)acrylate, or mixtures thereof, preferably a hexafunctional aromatic acrylate, an isocyanurate triacrylate, or mixtures thereof, more preferably a hexafunctional aromatic urethane acrylate, a tris (2-hydroxyethyl)isocyanurate triacrylate, or mixtures thereof.

K. The consumer product composition according to any of paragraphs A-J, wherein the first shell material comprises a first (meth)acrylate material, wherein the second shell material comprises a second (meth)acrylate material, wherein the first (meth)acrylate material is the same as the second (meth)acrylate material.

L. The consumer product composition according to any of paragraphs A-J, wherein the first shell material comprises a first (meth)acrylate material, wherein the second shell material comprises a second (meth)acrylate material, wherein the first (meth)acrylate material and the second (meth)acrylate material are derived from different monomers, different ratios of monomers, or a combination thereof.

M. The consumer product composition according to paragraph L, wherein the first (meth)acrylate material is derived, at least in part, from a hexafunctional (meth)acrylate monomer, and wherein the second (meth)acrylate material is derived, at least in part, from a tri(meth)acrylate monomer.

N. The consumer product composition according to any of paragraph A-J, wherein the first shell material comprises a (meth)acrylate material, and wherein the second shell material does not comprise a (meth)acrylate material, preferably wherein the second shell material comprises an aminoplast, a polyurea, or combinations thereof, more preferably wherein if an aminoplast is present, the aminoplast comprises melamine.

O. The consumer product to any preceding claim, wherein the first shell material, preferably a (meth)acrylate polymer, is derived, at least in part, from at least one free radical initiator, preferably wherein the at least one free radical initiator is present in amount of from about 2% to about 50%, preferably from about 5% to about 40%, more preferably from about 10% to about 40%, even more preferably from about 15% to about 40%, even more preferably from about 20% to about 35%, or more preferably from about 20% to about 30%, by weight of the first shell material.

P. The consumer product composition according to any preceding claim, wherein the predetermined particle size, based on particle diameter, is from 5 microns to 50 microns, preferably from 5 microns to 45 microns, more preferably from 5 microns to 20 microns, more preferably from 10 microns to 20 microns, most preferably 10 microns.

Q. The consumer product composition according to any preceding claim, wherein the first population of encapsulates is characterized by a first volume-weighted median particle size, wherein the second population of encapsulates is characterized by a second volume-weighted median particle size, wherein the difference of the first and second volume-weight median particle sizes is less than 15 microns, or less than 10 microns, or less than 5 microns, or less than 3 microns.

R. The consumer product composition according to any of paragraphs A-P, wherein the first population of encapsulates is characterized by a first volume-weighted median particle size, wherein the second population of encapsulates is characterized by a second volume-weighted median particle size, wherein the difference of the first and second volume-weight median particle sizes is greater than 5 microns, or greater than 10 microns, or greater than 15 microns, and preferably less than 50 microns.

S. The consumer product composition according to any of paragraphs A-R, wherein the first population of encapsulates is characterized by a first volume-weighted median particle size of from about 30 microns to about 50 microns, preferably wherein the second population of encapsulates is characterized by a second volume-weighted median particle size that is less than the first volume-weighted median particle size, preferably wherein the second volume-weighted median particle size is from about 10 microns to about 30 microns.

T. The consumer product composition according to any of paragraphs A-S, wherein the first benefit agent and the second benefit agent are different.

U. The consumer product composition according to any of paragraphs A-T, wherein the first benefit agent, the second benefit agent, or both comprise perfume raw materials, preferably wherein both comprise perfume raw materials, more preferably different perfume raw materials.

V. The consumer product composition according to any of paragraphs A-U, wherein the first core material, the second core material, or both further comprise a partitioning modifier, preferably wherein said partitioning modifier comprising a material selected from the group consisting of vegetable oil, modified vegetable oil, mono-, di-, and tri-esters of $C_4$-$C_{24}$ fatty acids, propan-2-yl tetradecanoate, isopropyl myristate, dodecanophenone, lauryl laurate, methyl behenate, methyl laurate, methyl palmitate, methyl stearate, and mixtures thereof, more preferably isopropyl myristate.

W. The consumer product composition according to any of paragraphs A-V, wherein the first shell material, the second shell material, or both further comprise a coating material, preferably wherein the coating material is selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines, copolymers of polyvinyl amines, and mixtures thereof.

X. The consumer product composition according to any of paragraphs A-W, wherein composition further comprise a treatment adjunct, preferably wherein the treatment adjunct is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

Y. The consumer product composition according to any of paragraphs A-X, wherein the composition is a laundry detergent composition, a fabric conditioning composition, a laundry additive, a fabric pre-treat composition, a fabric refresher composition, or a mixture thereof.

Z. The consumer product composition according to any of paragraphs A-Y, wherein the composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

AA. A consumer product composition comprising: a first population of first encapsulates having a first core material surrounded by a first shell material, the first core material comprising a first benefit agent, wherein the first wall material is derived, at least in part, from a hexafunctional (meth)acrylate monomer, a second population of second encapsulates having a second core material surrounded by a second shell material, the second core material comprising a second benefit agent, wherein the second wall material is derived, at least in part, from a trifunctional (meth)acrylate monomer, wherein the first and second populations of encapsulates are each independently characterized by a volume-weighted median particle size of from between about 10 um to about 50 um.

BB. The consumer product composition according to paragraph AA, wherein the first core material and the first shell material are present in a first core:shell weight ratio, wherein the second core material and the second shell material are present in a second core:shell weight ratio, wherein the first core:shell weight ratio is greater than the second core:shell weight ratio, preferably wherein the first core:shell weight ratio is greater than 90:10, more preferably greater than 95:5.

CC. A method of treating a surface, wherein the method comprises contacting the surface with a consumer product composition according to any of paragraphs A-BB, optionally in the presence of water.

Test Methods

It is understood that the test methods that are disclosed in the Test Methods Section of the present application should be used to determine the respective values of the parameters of Applicant's claimed subject matter as claimed and described herein.

Extraction of delivery particles from finished products.

Except where otherwise specified herein, the preferred method to isolate delivery particles from finished products is based on the fact that the density of most such delivery particles is different from that of water. The finished product is mixed with water in order to dilute and/or release the delivery particles. The diluted product suspension is centrifuged to speed up the separation of the delivery particles. Such delivery particles tend to float or sink in the diluted solution/dispersion of the finished product. Using a pipette or spatula, the top and bottom layers of this suspension are removed and undergo further rounds of dilution and centrifugation to separate and enrich the delivery particles. The delivery particles are observed using an optical microscope equipped with crossed-polarized filters or differential interference contrast (DIC), at total magnifications of 100× and 400×. The microscopic observations provide an initial indication of the presence, size, quality and aggregation of the delivery particles.

For extraction of delivery particles from a liquid fabric enhancer finished product conduct the following procedure:

1. Place three aliquots of approximately 20 ml of liquid fabric enhancer into three separate 50 ml centrifuge tubes and dilute each aliquot 1:1 with DI water (e.g. 20 ml fabric enhancer+20 ml DI water), mix each aliquot well and centrifuge each aliquot for 30 minutes at approximately 10000×g.
2. After centrifuging per Step 1, discard the bottom water layer (around 10 ml) in each 50 ml centrifuge tube then add 10 ml of DI water to each 50 ml centrifuge tube.
3. For each aliquot, repeat the process of centrifuging, removing the bottom water layer and then adding 10 ml of DI water to each 50 ml centrifuge tube two additional times.
4. Remove the top layer with a spatula or a pipette, and
5. Transfer this top layer into a 1.8 ml centrifuge tube and centrifuge for 5 minutes at approximately 20000×g.
6. Remove the top layer with a spatula and transfer into a new 1.8 ml centrifuge tube and add DI water until the tube is completely filled, then centrifuge for 5 minutes at approximately 20000×g.
7. Remove the bottom layer with a fine pipette and add DI water until tube is completely filled and centrifuge for 5 minutes at approximately 20000×g.
8. Repeat step 7 for an additional 5 times (6 times in total).

If both a top layer and a bottom layer of enriched delivery particles appear in the above described step 1, then, immediately move to step 3 (i.e., omit step 2) and proceed steps with steps 4 through 8. Once those steps have been completed, also remove the bottom layer from the 50 ml centrifuge tube from step 1, using a spatula or/and a pipette. Transfer the bottom layer into a 1.8 ml centrifuge tube and centrifuge 5 min at approximately 20000×g. Remove the bottom layer in a new tube and add DI water until the tube is completely filled then centrifuge for 5 minutes approximately 20000×g. Remove the top layer (water) and add DI water again until the tube is full. Repeat this another 5 times (6 times in total). Recombine the delivery particle enriched and isolated top and bottom layers back together.

If the fabric enhancer has a white color or is difficult to distinguish the delivery particle enriched layers add 4 drops of dye (such as Liquitint Blue JH 5% premix from Milliken & Company, Spartanburg, South Carolina, USA) into the centrifuge tube of step 1 and proceed with the isolation as described.

For extraction of delivery particles from solid finished products that disperse readily in water, mix 1 L of DI water with 20 g of the finished product (e.g. detergent foams, films, gels and granules; or water-soluble polymers; soap flakes and soap bars; and other readily water-soluble matrices such as salts, sugars, clays, and starches). When extracting delivery particles from finished products which do not disperse readily in water, such as waxes, dryer sheets, dryer bars, and greasy materials, it may be necessary to add detergents, agitation, and/or gently heat the product and diluent in order to release the delivery particles from the matrix. The use of organic solvents or drying out of the delivery particles should be avoided during the extraction steps as these actions may damage the delivery particles during this phase.

For extraction of delivery particles from liquid finished products which are not fabric softeners or fabric enhancers (e.g., liquid laundry detergents, liquid dish washing detergents, liquid hand soaps, lotions, shampoos, conditioners, and hair dyes), mix 20 ml of finished product with 20 ml of DI water. If necessary, NaCl (e.g., 1 to 4 g NaCl) can be added to the diluted suspension in order to increase the density of the solution and facilitate the delivery particles floating to the top layer. If the product has a white color which makes it difficult to distinguish the layers of delivery particles formed during centrifugation, a water-soluble dye can be added to the diluent to provide visual contrast.

The water and product mixture is subjected to sequential rounds of centrifugation, involving removal of the top and bottom layers, re-suspension of those layers in new diluent, followed by further centrifugation, isolation and re-suspension. Each round of centrifugation occurs in tubes of 1.5 to 50 ml in volume, using centrifugal forces of up to 20,000×g, for periods of 5 to 30 minutes. At least six rounds of centrifugation are typically needed to extract and clean sufficient delivery particles for testing. For example, the initial round of centrifugation may be conducted in 50 ml tubes spun at 10,000×g for 30 mins, followed by five more rounds of centrifugation where the material from the top and bottom layers is resuspended separately in fresh diluent in 1.8 ml tubes and spun at 20,000×g for 5 mins per round.

If delivery particles are observed microscopically in both the top and bottom layers, then the delivery particles from these two layers are recombined after the final centrifugation step, to create a single sample containing all the delivery particles extracted from that product. The extracted delivery particles should be analyzed as soon as possible but may be stored as a suspension in DI water for up to 14 days before they are analyzed.

One skilled in the art will recognize that various other protocols may be constructed for the extraction and isolation of delivery particles from finished products and will recognize that such methods require validation via a comparison of the resulting measured values, as measured before and after the delivery particles' addition to and extraction from finished product.

Benefit Agent Leakage

The amount of benefit agent leakage from the delivery particles is determined according to the following method:

a.) Obtain two samples of the raw material slurry of delivery particles in such amounts so that 1 g of encapsulated perfume (e.g., 1 g perfume oil, not including the shell and/or partitioning modifier, if present) is present in each sample (or other amount as so indicated).

b.) Add one sample of the raw material slurry of delivery particles to a suitable amount of the product matrix (e.g., a liquid detergent product or an LFE product) in which the delivery particles will be employed to form 100 g total (e.g., 5 g slurry and 95 g product matrix) and label the mixture as Sample 1. Immediately use the second sample of raw material delivery particle slurry in Step d below, in its neat form without contacting product matrix, and label it as Sample 2.

c.) Age the delivery-particle-containing product matrix (Sample 1) for one week at 35° C. (or other time and/or temperature, as so indicated) in a sealed, glass jar.

d.) Using filtration, recover the delivery particles from both samples. The delivery particles in Sample 1 (in product matrix) are recovered after the aging step. The delivery particles in Sample 2 (neat raw material slurry) are recovered at the same time that the aging step began for sample 1.

e.) Treat the recovered delivery particles with a solvent to extract the benefit agent materials from the delivery particles.

f.) Analyze the solvent containing the extracted benefit agent from each sample, via chromatography. Integrate the resultant benefit agent peak areas under the curve and sum these areas to determine the total quantity of benefit agent extracted from each sample.

g.) Determine the percentage of benefit agent leakage by calculating the difference in the values obtained for the total quantity of benefit agent extracted from Sample 2 minus Sample 1, expressed as a percentage of the total quantity of benefit agent extracted from Sample 2, as represented in the equation below:

$$\text{Percentage of Benefit Agent Leakage} = \left( \frac{\text{Sample 2} - \text{Sample 1}}{\text{Sample 2}} \right) \times 100$$

Viscosity

Viscosity of liquid finished product is measured using an AR 550 rheometer/viscometer from TA instruments (New Castle, DE, USA), using parallel steel plates of 40 mm diameter and a gap size of 500 μm. The high shear viscosity at 20 $s^{-1}$ and low shear viscosity at 0.05 $s^{-1}$ is obtained from a logarithmic shear rate sweep from 0.01 $s^{-1}$ to 25 $s^{-1}$ in 3 minutes time at 21° C.

Perfume, Perfume Raw Materials (PRMs), and/or Partitioning Modifier

A. Identity and Total Quantity

To determine the identity and to quantify the total weight of perfume, perfume ingredients, or Perfume Raw Materials (PRMs), or partitioning modifier in the capsule slurry, and/or encapsulated within the delivery agent encapsulates, Gas Chromatography with Mass Spectroscopy/Flame Ionization Detector (GC-MS/FID) is employed. Suitable equipment includes: Agilent Technologies G1530A GC/FID; Hewlett Packer Mass Selective Device 5973; and 5%-Phenyl-methyipolysiioxane Column J&W DB-5 (30 m length×0.25 mm internal diameter×0.25 μm film thickness). Approximately 3 g of the finished product or suspension of delivery encapsulates, is weighed and the weight recorded, then the sample is diluted with 30 mL of DI water and filtered through a 5.0 μm pore size nitrocellulose filter membrane. Material captured on the filter is solubilized in 5 mL of ISTD solution (25.0 mg/L tetradecane in anhydrous alcohol) and heated at 60° C. for 30 minutes. The cooled solution is filtered through 0.45 μm pore size PTFE syringe filter and analyzed via GC-MS/FID. Three known perfume oils are used as comparison reference standards. Data Analysis involves summing the total area counts minus the ISTD area counts and calculating an average Response Factor (RF) for the 3 standard perfumes. Then the Response Factor and total area counts for the product encapsulated perfumes are used along with the weight of the sample, to determine the total weight percent for each PRM in the encapsulated perfume. PRMs are identified from the mass spectrometry peaks.

B. Amount of Non-Encapsulated Material

In order to determine the amount of non-encapsulated perfume and (optionally) partitioning modifier material in a composition such as a slurry, the following equipment can be used for this analysis, using the analysis procedure provided after the table.

| | |
|---|---|
| Gas chromatograph/MS | Agilent GC6890 equipped with Agilent 5973N mass spectrometer or equivalent, capillary column operation, quantiation based on extracted ion capability, autosampler |
| Column for GC-MS | 30 m × 0.25 mm nominal diameter, 0.25 μm film thickness, J&W 122-5532 DB-5, or equivalent. |

To prepare a perfume standard in ISS Hexane, weigh 0.050+/−0.005 g of the desired PMC perfume oil into a 50 mL volumetric flask (or other volumetric size recalculating g of perfume oil to add). Fill to line with ISS Hexane solution from above. The ISS Hexane is a 0.1 g of Tetradecane in 4 liters of hexane.

To prepare a 5% surfactant solution, weigh 50 g+/−1 g of the sodium dodecyl sulphate in a beaker and, using purified water, transfer quantitatively to a 1 liter volumetric flask, and ensure the surfactant is fully dissolved.

To prepare the sample of the PMC composition (e.g., a slurry), confirm the composition (e.g., a slurry) is well mixed; mix if necessary. Weigh 0.3+/−0.05 g of composition sample onto the bottom of a 10 mL vial. Avoid composition on the wall of the vial.

To operate the instrument, determine a target ion for quantification for each PRM (and optionally partitioning modifier) along with a minimum of one qualifier ion, preferably two. Calibration curves are generated from the Perfume standard for each PRM. Utilizing the sample weight and individual PRM weight %, the integration of the extracted ion (EIC) for each PRM and the amount are plotted or recorded.

The amount of free oil is determined from the response of each PRM versus the calibration curve and summed over all the different perfume materials and optionally the partitioning modifier.

C. Determination of Encapsulated Material

The determination of the encapsulated oil and optionally the partitioning modifier is done by the subtraction of the weight of free/non-encapsulated oil found in the composition from the amount by weight of total oil found in the composition (e.g. a slurry).

Analytical Determination of Wall Materials

This method determines the amount of wall material. First, the wall material of particles with size larger than 0.45 micrometer are isolated via dead-end filtration. Subsequent analysis by thermogravimetric analysis allows for elimination of inorganic material and other (organic) raw material slurry ingredients.

A. Sample Preparation

The procedure applies dead-end filtration to eliminate soluble fractions of the sample. Different solvents in succession are used to maximize the removal of interfering substances prior to TGA analysis.

The following materials and/or equipment are used:

Filtration Equipment

- Vacuum pump: Millipore Model WP6122050 or equivalent.
- Thick walled vacuum tubing to connect pump with filtration device.
- Filtrations flasks 500 or 1000 ml.
- Filtration cup: e.g. 250 ml Millipore Filtration funnel ("Milli Cup"), filtration material: 0.45 micrometer membrane, solvent resistant.
- Sealable Plastic container to contain the filtration device while weighing.
- Standard laboratory glassware (glass beakers 100-250 ml, measuring cylinders 50-250 ml).

Drying Equipment

- Vacuum oven and vacuum pump (settings 60-70 C/vacuum: 30-inch Mercury vacuum).
- Desiccator or constant humidity chamber (keeping residues under controlled environment during cooling.

Solvents

- All solvents: Analytical Grade minimum: 2-Propanol, Acetone, Chloroform

The filtration procedure is as follows: To prepare the filtration device, record the weight of a pre-dried filtration device (e.g. Milli cup filter) down to 0.1-0.2 mg. Pre-drying involves the same drying steps as done for the filter after filtration is completed.

Filter the sample by weighing between 1 and 2 grams of Slurry Raw Material (note weight down to 0.1-0.2 mg) into a glass beaker (250 ml), or directly into the filtration device. Add 20 ml of deionized water and swirl to homogenize the sample. Add 80 ml of isopropylalcohol and homogenize sample with solvent; use heating to flocculate the sample. Put the filtration device onto a filtration bottle, and start up filtration with vacuum. After filtration is complete, add 100 ml Chloroform. Continue filtration. Add 10-20 ml Acetone and filter through the membrane to remove traces of chloroform. Remove the filter from the filtration system and dry it in a vacuum oven. After cooling, weigh the filter and record the weight.

Calculate the percent residue (gravimetric residue) by dividing the weight difference of Filter+Residue and Filter weight only (=net weight of residue after filtration) by the Raw Material Slurry sample weight and multiply by 100 to obtain % units. Continue with the measurement of % Residue via TGA analysis.

Thermo Gravimetric Analysis (TGA) is performed with the following equipment and settings: TGA:TA instruments Discovery TGA; Pans: Sealed Aluminum; Purge: N2 at 50 ml/min; Procedure: Ramp 10° C./min to 500° C.; TGA is coupled to a Nicolet Nexus 470 FTIR spectrometer for evolved gas.

For TGA data analysis, the weight loss between 350 and 500° C. is due to decomposition of polymer wall material of the perfume micro capsules and still residual (burned) perfume compounds. For calculation of insoluble polymer fraction this weight loss is used. At 500° C. there is still a residue which is un-burned material and should be considered when calculating the insoluble polymer fraction.

Analytical Determination of the Core:Wall Ratio

When the amount of core and wall material inputs are not readily available, the core:wall ratio of the encapsulates may be determined analytically using the methods described herein.

More specifically, the methods above allow determination (in weight) the amounts of perfume, partitioning modifier, and wall materials in the perfume capsule composition (e.g., a slurry) and can be used to calculate the core:wall ratio. This is done by dividing the total amount (by weight) of perfume plus partitioning modifier found in the composition divided by the amount (by weight) of cross-linked wall material found in the composition.

Test Method for Determining Log P

The value of the log of the Octanol/Water Partition Coefficient (log P) is computed for each PRM in the perfume mixture being tested. The log P of an individual PRM is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

Volume-Weighted Particle Size and Size Distribution

The volume-weighted capsule size distribution is determined via single-particle optical sensing (SPOS), also called optical particle counting (OPC), using the AccuSizer 780 AD instrument and the accompanying software CW788 version 1.82 (Particle Sizing Systems, Santa Barbara, California, U.S.A.), or equivalent. The instrument is configured with the following conditions and selections: Flow Rate=1 ml/sec; Lower Size Threshold=0.50 μm; Sensor Model Number=Sensor Model Number=LE400-05 or equivalent; Autodilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at least 9200 per ml. During a time period of 60 seconds the suspension is analyzed. The resulting volume-weighted PSD data are plotted and recorded, and the values of the desired volume-weighted particle size (e.g., the median/50$^{th}$ percentile, 5$^{th}$ percentile, and/or 90$^{th}$ percentile) are determined.

The broadness index can be calculated by determining the delivery particle size at which 90% of the cumulative particle volume is exceeded (90% size), the particle size at which 5% of the cumulative particle volume is exceeded (5% size), and the median volume-weighted particle size (50% size: 50% of the particle volume both above and below this size).

Broadness Index=((90% size)−(5% size))/50% size.

Fracture Strength Test Method

To measure average Fracture Strength for the population, and/or determine Delta Fracture Strength, three different measurements are made: i) the volume-weighted capsule size distribution; ii) the diameter of 10 individual capsules within each of 3 specified size ranges (and/or 30 individual capsules at the median volume-weighted particle size, if average Fracture Strength is to be determined), and; iii) the rupture-force of those same 30 individual capsules.

a.) The volume-weighted capsule size distribution is determined as described above. The resulting volume-weighted PSD data are plotted and recorded, and the values of the median, 5$^{th}$ percentile, and 90$^{th}$ percentile are determined.

b.) The diameter and the rupture-force value (also known as the bursting-force value) of individual capsules are measured via a custom computer-controlled micromanipulation instrument system which possesses lenses and cameras able to image the delivery capsules, and which possess a fine, flat-ended probe connected to a force-transducer (such as the Model 403A available from Aurora Scientific Inc, Canada) or equivalent, as described in: Zhang, Z. et al. (1999) "Mechanical strength of single microcapsules determined by a novel micromanipulation technique." *J. Microencapsulation*, vol 16, no. 1, pages 117-124, and in: Sun, G. and Zhang, Z. (2001) "Mechanical Properties of Melamine-Formaldehyde microcapsules." *J. Microencapsulation*, vol 18, no. 5, pages 593-602, and as available at the University of Birmingham, Edgbaston, Birmingham, UK.

c.) A drop of the delivery capsule suspension is placed onto a glass microscope slide, and dried under ambient conditions for several minutes to remove the water and achieve a sparse, single layer of solitary capsules on the dry slide. Adjust the concentration of capsules in the suspension as needed to achieve a suitable capsule density on the slide. More than one slide preparation may be needed.

d.) The slide is then placed on a sample-holding stage of the micromanipulation instrument. Thirty benefit delivery capsules on the slide(s) are selected for measurement, such that there are ten capsules selected within each of three pre-determined size bands. Each size band refers to the diameter of the capsules as derived from the Accusizer-generated volume-weighted PSD. The three size bands of capsules are: the Median/50$^{th}$ Percentile Diameter+/−2 μm; the 5$^{th}$ Percentile Diameter+/−2 μm; and the 90$^{th}$ Percentile Diameter+/−2 μm. Capsules which appear deflated, leaking or damaged are excluded from the selection process and are not measured.

i. If enough capsules are not available at a particular size band+/−2 μm, then the size band may be increased to +/−5 μm.

ii. If average Fracture Strength for the population is to be determined, then 30 (or more) capsules at the median/50$^{th}$ Percentile size band may be measured.

e.) For each of the 30 selected capsules, the diameter of the capsule is measured from the image on the micromanipulator and recorded. That same capsule is then compressed between two flat surfaces, namely the flat-ended force probe and the glass microscope slide, at a speed of 2 μm per second, until the capsule is ruptured. During the compression step, the probe force is continuously measured and recorded by the data acquisition system of the micromanipulation instrument.

f) The cross-sectional area is calculated for each of the selected capsules, using the diameter measured and assuming a spherical capsule ($\pi r^2$, where r is the radius of the capsule before compression). The rupture force is determined for each selected capsule from the recorded force probe measurements, as demonstrated in Zhang, Z. et al. (1999) "Mechanical strength of single microcapsules determined by a novel micromanipulation technique." *J. Microencapsulation*, vol 16, no. 1, pages 117-124, and in: Sun, G. and Zhang, Z. (2001) "Mechanical Properties of Melamine-Formaldehyde microcapsules." *J. Microencapsulation*, vol 18, no. 5, pages 593-602.

g.) The Fracture Strength of each of the 30 capsules is calculated by dividing the rupture force (in Newtons) by the calculated cross-sectional area of the respective capsule.

h.) Calculations:

Average Fracture Strength for the population is determined by averaging the Fracture Strength values of (at least) thirty capsules at the Median/50$^{th}$ Percentile size band.

The Delta Fracture Strength is calculated as follows:

$$\text{Delta Fracture Strength (\%)} = \frac{FS\ @d_5 - FS@d_{90}}{FS\ @d_{50}} * 100$$

where FS at di is the FS of the capsules at the percentile i of the volume-weighted size distribution.

EXAMPLES

The examples provided below are intended to be illustrative in nature and are not intended to be limiting.

Example 1. Exemplary Synthesis of a First Population of Encapsulates

An exemplary synthesis process for an encapsulate population having a core:wall ratio of approximately 98:2 is provided below. Details for the materials used are provided in Table 1, as are alternative wall monomers.

To a 1 L capacity water jacketed stainless steel reactor, 143.12 grams of perfume oil and 137.45 grams of isopropyl myristate are added and allowed to mix with the aid of a high shear mixer fitted with a mill blade, under a nitrogen environment. The solution is heated to 35 C before introducing 0.33 grams of Vazo67 (initiator) and the total mixture is subsequently heated to 70 C and is maintained at that temperature for 45 minutes before cooling the system down to 50 C. As soon as the temperature was reached, a solution, prepared separately, containing 63.05 grams of perfume oil, 0.075 grams of CD9055, 0.075 grams of TBAEMA, and 6.23 grams of CN975 is introduced into the reactor and the total mixture is allowed to mix for 10 min while at 50 C. The water phase, consisting of 107 grams of emulsifier (5% solution of PVOH 540), 340.03 grams of RO water, 0.22 grams of V-501, and 0.21 grams of NaOH (21% solution) is then added to the reactor, after stopping agitation. Milling ensues after the addition of the water phase until the particle size was reached. The emulsion is then heated first to 75 C and maintained at that temperature for 240 minutes and then heated to 95 C for 360 min before cooling it down to 25 C. At that point, the slurry is evacuated from the reactor into a container to add the rheology modifier (Xanthan gum 1.59 grams) and preservative (Acticide BWS-10; 0.61 grams). The rheology modifier is allowed to mix in for 30 min. The preservative is added last and allowed to mix for 5-10 min. The finished slurry is then characterized and tested as deemed fit.

Alternative capsules may be made according to substantially similar processes by substituting the CN975 monomer with a multifunctional acrylate monomer found in Table 1 below (e.g., EB140, SR295, SR444, TMPTA-1, SR368, or EB895).

Core:Wall Weight Ratio—Sample Calculation

The core:wall weight ratio is determined by dividing the weight of the total core material inputs (e.g., perfume oil and partitioning modifier) by the weight of the total wall material inputs (e.g., wall monomers and initiators). Alternatively, the relative percentage of core material in the particle population can be determined by dividing the weight of the total core material inputs by the sum of the total weight of the core material inputs plus the total weight of the wall material inputs and multiplying by 100; the remaining percentage (100-% core) is the relative percentage of the wall material—these numbers may then be expressed as a ratio. Similarly, the relative percentage of wall material in the particle population can be determined by dividing the total weight of the wall material inputs by the sum of the weights of the total core material inputs and the total wall material inputs and multiplying by 100.

A sample calculation for the "98:2" capsules formed by the example of this section is provided below, where the core comprises the perfume oil and a partitioning modifier (isopropyl myristate), and the wall comprises the wall monomers (CN975, CD9055, and TBAEMA) and the initiators (Vazo67 and V-501).

$$\%\text{ core} = \frac{(\text{perfume oil} + \text{partitioning modifier})}{\left(\begin{array}{c}\text{perfume oil} + \text{partitioning modifier} + \\ \text{wall monomers} + \text{initiators}\end{array}\right)} \times 100$$

$$\%\text{ core} = \frac{(143.12\text{ g} + 63.05\text{ g} + 137.45\text{ g})}{\left(\begin{array}{c}143.12\text{ g} + 63.05\text{ g} + 137.45\text{ g} + 6.23\text{ g} + \\ 0.075\text{ g} + 0.075\text{ g} + 0.33\text{ g} + 0.22\text{ g}\end{array}\right)} \times 100$$

$$\%\text{ core} = \frac{343.62}{350.55} \times 100 = 98.02\%\text{ core material}$$

(and 1.98% wall material)

TABLE 1

| Name | Company/City | Chemical Description |
|---|---|---|
| CN975 | Sartomer Company, Exton, PA | hexafunctional urethane acrylate ester |
| EB140 | Allnex USA, Inc., Alpharetta, GA | ditrimethylolpropane tetraacrylate |
| SR295 | Sartomer Company, Exton, PA | pentaerythritol tetraacrylate |
| SR444 | Sartomer Company, Exton, PA | pentaerythritol triacrylate |
| TMPTA-1 | Allnex USA, Inc., Alpharetta, GA | trimethylolpropane triacrylate |
| SR368 | Sartomer Company, Exton, PA | tris (2-hydroxyethyl) isocyanurate triacrylate with aliphatic urethane acrylate |
| EB895 | Allnex USA, Inc., Alpharetta, GA | dipentaerythritol penta/hexa acrylate |
| TBAEMA | NovaSol North America Inc., Stoney Creek, ON, Canada | 2-(tert-butylamino) ethyl methacrylate |
| CD9055 | Sartomer Company, Exton, PA | acid acrylate |
| Vazo 67 (initiator) | Chemours Company, Wilmington, DE | 2,2'-azobis (2-methylbutyronitrile) |
| V-501 (initiator) | Sigma-Aldrich Corp., St. Louis, MO | 4,4'-Azobis(4-cyanovaleric acid) |

Example 2. Fracture Strength Data of Exemplary Encapsulate Populations

Exemplary populations of perfume encapsulates are made substantially according to the synthesis procedure of Example 1 above, where the walls are made primarily with the CN975 acrylate monomer. Differences in the populations are provided below in Table 2A.

Ex. 1A and 1B are labeled as comparative examples because they include are characterized by a core:shell that is not aligned with the core:shell ratio of the first encapsulate populations as described and claimed herein. However, either could serve as the second encapsulate population. The amount of initiators is provided as a percentage of the total wall material (e.g., monomers plus initiators).

TABLE 2A

| Ex. | Core:Shell Weight Ratio | Target Volume-Weighted Median Particle Size (μm) | Initiator 1[a] (wall %) | Initiator 2[b] (wall %) |
|---|---|---|---|---|
| 1A (comp.) | 90:10 | 18 | 4.8 | 5.8 |
| 1B (comp.) | 90:10 | 36 | 4.8 | 5.8 |
| 2 | 97:3 | 18 | 5.8 | 5.8 |
| 3 | 97:3 | 27 | 4.8 | 3.3 |
| 4 | 97:3 | 36 | 4.8 | 3.9 |
| 5 | 97:3 | 36 | 2.4 | 0 |
| 6 | 97:3 | 36 | 0 | 2.9 |
| 7 | 97:3 | 36 | 4.8 | 2.9 |
| 8 | 97.5:2.5 | 27 | 4.8 | 3.4 |
| 9 | 97.5:2.5 | 36 | 4.8 | 3.6 |
| 10 | 98:2 | 36 | 4.8 | 3.2 |
| 11 | 98:2 | 36 | 4.8 | 3.2 |
| 12 | 98:2 | 18 | 4.8 | 3.2 |

[a]Initiator 1 = 2,2'-Azobis(2-methylbutyronitrile)/CAS No.: 13472-08-7
[b]Initiator 2 = 4,4'-Azobis(4-cyanovaleric acid)/CAS No.: 2638-94-0

The encapsulate populations of Ex. 1A, 1B, and 2-12 are analyzed for volume weighted encapsulate size at various points of the size distribution (at 5%, 50%, and 90%), and the Fracture Strength at each point is determined. From this data, the Broadness Index and Delta Fracture Strength are determined according to the test methods provided above. The results are provided in Table 2B.

TABLE 2B

| | Encapsulate size (μm) | | | Broadness | Fracture Strength (MPa) | | | Delta Fracture Strength |
|---|---|---|---|---|---|---|---|---|
| Ex. | @ $d_5$ | @ $d_{50}$ | @ $d_{90}$ | Index | @ $d_5$ | @ $d_{50}$ | @ $d_{90}$ | (%) |
| 1A (comp.) | 4.5 | 16.8 | 34.7 | 1.80 | 14.2 | 2.8 | 1.1 | 467.9 |
| 1B (comp.) | 9.2 | 36.1 | 50.1 | 1.13 | 6.2 | 0.8 | 0.6 | 700.0 |
| 2 | 5.2 | 17.8 | 27.6 | 1.26 | 3.0 | 2.7 | 1.9 | 40.7 |
| 3 | 6.9 | 27.6 | 37.9 | 1.12 | 6.9 | 1.7 | 1.5 | 317.6 |
| 4 | 8.6 | 23.2 | 48.3 | 1.71 | 4.2 | 2.2 | 1.0 | 145.5 |
| 5 | 9.6 | 36.5 | 48.3 | 1.06 | 3.75 | 1.25 | 0.95 | 224.0 |
| 6 | 8.7 | 36.5 | 51.3 | 1.17 | 3.05 | 0.9 | 0.66 | 265.6 |
| 7 | 9.0 | 36.1 | 49.5 | 1.12 | 3.7 | 1.5 | 1.0 | 180.0 |
| 8 | 6.7 | 28.0 | 38.3 | 1.13 | 4.2 | 2.6 | 1.5 | 103.8 |
| 9 | 9.3 | 35.2 | 47.7 | 1.09 | 4.0 | 1.5 | 1.0 | 200.0 |
| 10 | 8.8 | 35.6 | 50.1 | 1.16 | 2.7 | 1.2 | 0.9 | 150.0 |
| 11 | 9.2 | 39.4 | 60.2 | 1.29 | 1.4 | 1.3 | 1.0 | 30.8 |
| 12 | 5.8 | 19.2 | 29.0 | 1.21 | 2.2 | 1.3 | 0.9 | 100.0 |

FIG. 1 shows a graph of several examples from Tables 2A and 2B above, where the encapsulate sizes at d5, d50, and d90 are graphed against the respective Fracture Strengths. As shown on the graph of FIG. 1 and in Table 2B above, comparative Ex. 1A shows a J-type curve, where the Fracture Strength at d5 is relatively higher that the Fracture Strengths at d50 and d90. On the other hand, Exs. 2, 4 and 10 according to the present disclosure show curves that are relatively flat compared to comparative Example 1A. It is believed that when two populations of encapsulates are chosen that have different Fracture Strength profiles, particularly when at least one of them is characterized by a core:shell ratio of 95:5 or greater, improved consumer products can be formulated.

For example, as shown in the graph of FIG. 1, a 10-micron capsule of Ex. 2 (e.g., a first population) are expected to have a different Fracture Strength than a 10-micron capsules of Ex. 1A (e.g., a second population). This may result in a preferred perfume release over a variety of touchpoints.

Looking at another comparison, according to Table 2B, encapsulates of Ex. 1B and Ex. 11 have a similar median particle sizes (36.1 vs. 39.4 microns), and the same particle size at d5 (9.2 microns). However, the populations differ in the core:wall ratios (90:10 vs. 98:2). It is believed that this difference leads to the different Fracture Strengths at d5 for particles that are approximately the same size: 6.2 MPa vs. 1.4 MPa, an absolute difference of 4.8 MPa. Further, the Fracture Strength at 9.2 microns of the particles of Ex. 1B is more than 400% that of the particles of Ex. 11. Due to these different Fracture Strengths for particles of the same size, it is believed that a product formulated with these two populations would have a positive perfume release profile over a number of touchpoints.

Example 3. Comparison of Dual Encapsulate Populations (1)

In the following example, liquid fabric enhancer compositions are compared, where each contains two populations of perfume encapsulates. The shell materials of the various encapsulate populations are substantially the same (acrylate-based shells—primarily CN975 monomer, ex Sartomer), although present in different core:shell weight ratios, as indicated in Table 3A. Furthermore, the first encapsulate populations of Formulations 2 and 3 have a reduced perfume load and slightly different perfume formulation (e.g., some perfume raw materials are left out) compared to the perfume of the first encapsulate population of comparative Formulation 1.

The encapsulate populations are described in more detail in Table 3A. The "Perfume Delivered" provided in Table 3A is the amount of perfume provided by the encapsulate population, by weight of the final product composition.

TABLE 3A

| | First Encapsulate Population | | Second Encapsulate Population | |
|---|---|---|---|---|
| Formulation | Core:Shell Weight Ratio | 1st Perfume Delivered (wt %) | Core:Shell Weight Ratio | 2nd Perfume Delivered (wt %) |
| 1 (comp.) | 90:10 | 0.2% | 90:10 | 0.2% |
| 2 | 98:2 | 0.17% | 90:10 | 0.2% |
| 3 | 98:2 | 0.14% | 90:10 | 0.2% |

Formulations 1, 2, and 3 are used in a laundry process to treat fabric swatches. After the fabrics have been treated, expert perfumers perform an olfactive assessment for perfume intensity at WET, DRY, and RUB touchpoints, and the scores at each touchpoint are averaged to give a score for that touchpoint. Scores are based on a perfume odor intensity scale from 0 to 100, where 0=no perfume odor, 25=slight perfume odor, 50=moderate perfume odor, 75=strong perfume odor, and 100=extremely strong perfume odor. The results are provided in Table 3B. Formulation 1, a comparative example, is used as the reference. Entries with an asterix (*) are statistically significant over the reference value in the same column.

TABLE 3B

| | Avg. Olfactive Score at Indicated Touchpoint | | |
|---|---|---|---|
| Formulation | WET | DRY | RUB |
| 1 (comp.) | 64.0 | 44.7 | 52.0 |
| 2 | 66.3 * | 51.8 * | 59.2 * |
| 3 | 65.5 | 50.2 * | 55.4 * |

As shown in Table 5B, Formulations 2 and 3 perform significantly better than comparative Formulation 1 at two or more touchpoints, even while delivering relatively less perfume.

Example 4. Comparison of Dual Encapsulate Populations (2)

In the following example, liquid fabric enhancer compositions are compared, where each contains two populations of perfume encapsulates. In addition to the differences in the primary shell material noted in Table 4A, the first encapsulate population of Formulation 2 has a reduced perfume load and slightly different formulation (e.g., some perfume raw materials are left out).

TABLE 4A

| | First Encapsulate Population | | | Second Encapsulate Population | | |
|---|---|---|---|---|---|---|
| Formulation | Shell Material | Core:Shell Weight Ratio | 1st Perfume Delivered (wt %) | Shell Material | Core:Shell Weight Ratio | 2nd Perfume Delivered (wt %) |
| 1 (comp.) | MF [1] | 86:14 | 0.1% | Acrylate [2] | 90:10 | 0.1% |
| 2 | Acrylate [2] | 98:2 | 0.085% | Acrylate [2] | 90:10 | 0.1% |

[1] MF = melamine formaldehyde; encapsulates from Encapsys, LLC (Appleton, WI)

[2] Acrylate = CN975 monomer (ex. Sartomer)

Formulations 1 and 2 are used in a laundry process, and the treated fabrics are tested for Wet Fabric Odor (WET), Room Bloom at time 0 (RB—0 h), and Room Bloom after one hour (RB—1 h), according to the scoring method provided in Example 3. The results are provided in Table 4B. Formulation 1, a comparative example, is used as the reference. Entries with an asterix (*) are statistically significant over the reference value in the same column.

TABLE 4B

| | Avg. panelist score by touchpoint | | |
|---|---|---|---|
| Formulation | WET | RB (0 h) | RB (1 h) |
| 1 (comp.) | 60.9 | 58.6 | 53.3 |
| 2 | 63.5 | 65.3 * | 59.8 * |

As shown in Table 4B, Formulation 2 performs significantly better than comparative Formulation 1 at the two Room Bloom touchpoints (and directional better on Wet Fabric Odor), even while delivering relatively less perfume.

Example 5. Benefits of Dual Encapsulate Populations

In this example, various combinations of acrylate-based perfume encapsulates are provided to a liquid fabric enhancer product and tested for freshness performance. The capsule populations are described in Table 5A. Particle size provided in Table 5A is the target volume-weighted median particle size for the population.

TABLE 5A

| Encapsulate Population | Wall Material (primary monomer) | Core:Wall Wt. Ratio | Particle Size (microns) | Partitioning Modifier[1] (wt % of core) | Perfume Type |
|---|---|---|---|---|---|
| A | Acrylate (CN975[2]) | 90:10 | 18 μm | 40% | Perfume 1 |
| B | Acrylate (CN975[2]) | 98:2 | 36 μm | 40% | Perfume 1 |
| C | Acrylate (CN975[2]) | 97.5:2.5 | 36 μm | 40% | Perfume 1 |
| D | Acrylate (SR368[3]) | 87:13 | 36 μm | 10% | Perfume 1 |
| E | Acrylate (CN975[2]) | 90:10 | 18 μm | 45% | Perfume 2 |

[1]Partitioning modifier = isopropyl myristate
[2]CN975 = hexafunctional aromatic urethane acrylate ester (ex Sartomer Company, Exton, PA)
[3]SR368 = tris (2-hydroxyethyl) isocyanurate triacrylate with aliphatic urethane acrylate (ex Sartomer Company, Exton, PA)

For each leg of the test, one or more populations are provided to a base liquid fabric enhancer composition (with 7 wt % ester quat as softening active) in amounts so as to provide equal levels (0.2 wt %) of perfume to the final product. For test legs in which two populations of encapsulates are provided to a single product (e.g., Legs 2-6), the encapsulates are provided in amounts so that each population contributes 0.1 wt % of the perfume, respectively (50:50 wt ratio).

Fabric (cotton terry swatches) are treated in a laundry cycle—a short cotton cycle in an automatic washing machine (1200 rpm)—with the fabric enhancer being added during the last rinse cycle.

TABLE 5B

| Leg | First Encap. Pop. | Second Encap. Pop. | Avg. Olfactive Score at Indicated Touchpoint: RUB | DRY | WET | TOUCH PT. AVG |
|---|---|---|---|---|---|---|
| 1* | A | (none) | 56.7 | 48 | 46.6 | 50.4 |
| 2 | A | B | 58.3 | 51.4 | 57.3 | 55.7 |
| 3 | B | C | 59.9 | 53.6 | 62.1 | 58.5 |
| 4 | B | D | 55.4 | 49 | 60.3 | 54.9 |
| 5* | A | E | 56.3 | 47.8 | 65.9 | 56.7 |
| 6 | B | E | 60.8 | 54 | 52.4 | 52.4 |

*comparative examples

TABLE 5C

| Leg | First Encap. Pop. | Second Encap. Pop. | Headspace Analysis at Indicated Touchpoint (nMol/L): RUB | DRY | WET | TOUCH PT. AVG |
|---|---|---|---|---|---|---|
| 1* | A | (none) | 115 | 80.5 | 116 | 103.8 |
| 2 | A | B | 126 | 122 | 108 | 118.7 |
| 3 | B | C | 148 | 116 | 93.6 | 119.2 |
| 4 | B | D | 157 | 118 | 206 | 160.3 |
| 5* | A | E | 88.5 | 70 | 76.6 | 78.4 |
| 6 | B | E | 116 | 79.1 | 72.5 | 89.2 |

*comparative examples

After the fabrics have been treated, expert perfumers perform an olfactive assessment for perfume intensity at the RUB, DRY, and WET touchpoints, and the scores are averaged. Scores are based on a perfume odor intensity scale from 0 to 100, where 0=no perfume odor, 25=slight perfume odor, 50=moderate perfume odor, 75=strong perfume odor, and 100=extremely strong perfume odor. Additionally, the average olfactory score for a given leg across the three touchpoints is provided ("TOUCH PT. AVG."). Furthermore, headspace data is collected above the treated fabric at each touchpoint using a GCMS instrument. Results are provided in Table 5B (olfactive scores) and in Table 5 C (headspace data).

Legs 1 and 5 are comparative examples; for example, the test compositions do not include an encapsulate population having the preferred core:wall weight ratio (e.g., 95:5 or greater) according to the present disclosure.

As shown by the data in Tables 5B and 5 C, fabric enhancer products that include first and second encapsulate populations, where at least one population includes encapsulates that are characterized by a core:shell weight ratio of at least 95:5 (e.g., Encapsulate Populations B and C, exemplified in Legs 2, 3, 4, and 6), typically perform better compared to those having comparative encapsulate populations with similar perfume systems and levels, particularly at the RUB and DRY touchpoints. Compare, for example, comparative Leg 1 to Legs 2, 3, and 4. Also compare, for example, comparative Leg 5 to Leg 6.

Example 6. Exemplary Formulations—Liquid Fabric Enhancers

Table 6 shows exemplary formulations of compositions according to the present disclosure. Specifically, the following compositions are liquid fabric enhancer products.

TABLE 6

| | % Active (w/w) | | |
|---|---|---|---|
| Ingredient | Composition 1 | Composition 2 | Composition 3 |
| Quaternary ammonium ester material | 5% (Ester Quat 1)[1] | 7% (Ester Quat 2)[2] | 8% (Ester Quat 3)[3] |
| Delivery Particles 1* (w/encapsulated fragrance) | 0.25% | 0.25% | 0.25% |
| Delivery Particles 2** (w/encapsulated fragrance) | 0.25% | 0.25% | 0.25% |
| Formic Acid | 0.045% | 0.045% | 0% |
| Hydrochloric acid | 0.01% | 0% | 0% |
| Preservative | 0.0045% | 0% | 0% |
| Chelant | 0.0071% | 0.0071% | 0% |
| Structurant | 0.10% | 0.30% | 0.1% |
| Antifoam | 0.008% | 0.00% | 0% |
| Water | Balance | Balance | Balance |

[1]Ester Quat 1: Mixture of bis-(2-hydroxypropyl)-dimethylammonium methylsulfate fatty acid ester, (2-hydroxypropyl)-(1-methyl-2-hydroxyethyl)-dimethylammonium methylsulfate fatty acid ester, and bis-(1-methyl-2-hydroxyethyl)-dimethylammonium methylsulfate fatty acid ester, where the fatty acid esters are produced from a C12-C18 fatty acid mixture (REWOQUAT DIP V 20 M Conc, ex Evonik)
[2]Ester Quat 2: N,N-bis(hydroxyethyl)-N,N-dimethyl ammonium chloride fatty acid ester, produced from C12-C18 fatty acid mixture (REWOQUAT CI-DEEDMAC, ex Evonik)
[3]Ester Quat 3: Esterification product of fatty acids (C16-18 and C18 unsaturated) with triethanolamine, quaternized with dimethyl sulphate (REWOQUAT WE 18, ex Evonik)
*Delivery particles according to the present disclosure, e.g., Encapsulate Population B disclosed in Table 5B above. The "% Active" provided is the amount of fragrance delivered to the composition.
**Delivery particles according to the present disclosure, e.g., Encapsulate Population D disclosed in Table 5B above, but loaded with Perfume 2. The "% Active" provided is the amount of fragrance delivered to the composition.

Example 7. Exemplary Formulations—Laundry Additive Particles

Table 7 shows exemplary formulations of compositions according to the present disclosure. Specifically, the following compositions are laundry additive particles in the form of a pastille or "bead," similar in form to those sold as DOWNY UNSTOPABLES (ex The Procter & Gamble Co.).

TABLE 7

| Ingredient | Ex. 1 | Ex. 2 | Ex. 3 | Ex. 4 | Ex. 5 | Ex. 6 |
|---|---|---|---|---|---|---|
| Polyethylene Glycol MW 8000 [1] | 64% | 65% | 63% | 83.5% | 81.5% | 61% |
| Ester Quat [2] | 25% | 27% | 25% | — | — | 24% |
| CatHEC [3] | 3% | 3% | — | — | — | — |
| Perfume | — | — | — | 10.3% | 13.3% | 5% |
| Encapsulate Slurry 1 [4] | 4% | 2% | 6% | 2.5% | 2.6% | 5% |
| Encapsulate Slurry 2 [5] | 4% | 2% | 6% | 2.5% | 2.6% | 5% |

[1] PLURIOL E8000 (ex BASF)
[2] Esterification product of fatty acids (C16-18 and C18 unsaturated) with triethanolamine, quaternized with dimethyl sulphate (REWOQUAT WE 18, ex Evonik)
[3] Cationically-modified hydroxyethylcellulose
[4] Fragrance delivery particles according to the present disclosure, e.g., Encapsulate Population B disclosed in Table 5B above. The % provided is the amount of aqueous slurry provided to the composition, where the slurry comprises about 45wt % of delivery particles (core + shell).
[5] Fragrance delivery particles according to the present disclosure, e.g., Encapsulate Population D disclosed in Table 5B above, but loaded with Perfume 2. The % provided is the amount of aqueous slurry provided to the composition, where the slurry comprises about 45 wt % of delivery particles (core + shell).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A consumer product composition comprising:

a first population of encapsulates having a first core material surrounded by a first shell material, the first core material comprising a first benefit agent, wherein the first core material and the first shell material are present in a first core: shell weight ratio of 95:5 or greater; and a second population of encapsulates having a second core material surrounded by a second shell material, the second core material comprising a second benefit agent, wherein the second core material and the second shell material are present in a second core: shell weight ratio of less than 95:5;

wherein the first population of encapsulates and the second population of encapsulates have the same particle size;

wherein the first population of encapsulates have a first fracture strength;

wherein the second population of encapsulates have a second fracture strength; and wherein the first fracture strength is different than the second fracture strength.

2. The consumer product composition according to claim 1, wherein the difference between the first fracture strength and the second fracture strength is at least 0.5 MPa.

3. The consumer product composition according to claim 2, wherein the particle size, based on particle diameter, is from 5 microns to 50 microns.

4. The consumer product composition according to claim 2, wherein one of the following is true:

the first fracture strength is no greater than 75% of the second fracture strength; or the first fracture strength is at least 125% of the second fracture strength.

5. The consumer product composition according to claim 2, wherein the first fracture strength, the second fracture strength, or both are from about 0.5 to about 10 MPa.

6. The consumer product composition according to claim 1, wherein the first core: shell weight ratio is at least 96:4.

7. The consumer product composition according to claim 1, wherein the second core material and the second shell material are present in a second core: shell weight ratio of less than 92:8.

8. The consumer product composition according to claim 1, wherein the first shell material, the second shell material, or both comprise a (meth)acrylate material.

9. The consumer product composition according to claim 8, wherein the (meth)acrylate material is derived, at least in part, from a multifunctional (meth)acrylate monomer or oligomer having at least three radical polymerizable functional groups, with the proviso that at least one of the radical polymerizable groups is acrylate or methacrylate.

10. The consumer product composition according to claim 9, wherein the (meth)acrylate monomer or oligomer is a monomer selected from the group consisting of a hexafunctional (meth)acrylate, a trifunctional (meth)acrylate, or mixtures thereof.

11. The consumer product composition according to claim 1, wherein the first shell material comprises a first (meth)acrylate material, wherein the second shell material comprises a second (meth)acrylate material, wherein the first (meth)acrylate material is the same as the second (meth)acrylate material.

12. The consumer product composition according to claim 1, wherein the first shell material comprises a first (meth)acrylate material, wherein the second shell material comprises a second (meth)acrylate material, wherein the first (meth)acrylate material and the second (meth)acrylate material are derived from different monomers, different ratios of monomers, or a combination thereof.

13. The consumer product composition according to claim 1, wherein the first shell material comprises a (meth)acrylate material, and wherein the second shell material does not comprise a (meth)acrylate material.

14. The consumer product according to claim 1, wherein the first shell material is derived, at least in part, from at least one free radical initiator, wherein the at least one free radical initiator is present in amount of about 2% to about 50%, by weight of the first shell material.

15. The consumer product composition according to claim 1, wherein the first population of encapsulates is characterized by a first volume-weighted median particle size of about 30 microns to about 50 microns.

16. The consumer product composition according to claim 1, wherein the first benefit agent and the second benefit agent are different.

17. The consumer product composition according to claim 1, wherein the first benefit agent, the second benefit agent, or both comprise perfume raw materials.

18. The consumer product composition according to claim 1, wherein the first core material, the second core material, or both further comprise a partitioning modifier, wherein said partitioning modifier comprises a material selected from the group consisting of vegetable oil, modified vegetable oil, mono-, di-, and tri-esters of $CD_4$-$C_{24}$ fatty acids, propan-2-yl tetradecanoate, isopropyl myristate, dodecanophenone, lauryl laurate, methyl behenate, methyl laurate, methyl palmitate, methyl stearate, and mixtures thereof.

19. The consumer product composition according to claim 1, wherein the first shell material, the second shell material, or both further comprise a coating material.

20. The consumer product composition according to claim 1, wherein the consumer product composition further comprises a treatment adjunct.

21. The consumer product composition according to claim 1, wherein the composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

22. A method of treating a surface, wherein the method comprises contacting the surface with a consumer product composition according to claim 1, optionally in the presence of water.

23. A consumer product composition comprising:

a first population of encapsulates comprising a first core material surrounded by a first shell material, the first core material comprising a first benefit agent, wherein the first core material and the first shell material are present in a first core: shell weight ratio of 95:5 or greater, wherein first population of encapsulates have a first fracture strength; and a second population of encapsulates comprising a second core material surrounded by a second shell material, the second core material comprising a second benefit agent, wherein second population of encapsulates have a second fracture strength, wherein the first population of encapsulates and the second population of encapsulates have the same particle size; and wherein the difference between the first fracture strength and the second fracture strength is at least 1.0 MPa.

* * * * *